United States Patent [19]
Sugikawa

[11] Patent Number: 6,110,417
[45] Date of Patent: Aug. 29, 2000

[54] POROUS METALLIC SHEET USED AS AN ELECTRODE SUBSTRATE OF A BATTERY AND METHOD OF MANUFACTURING THE POROUS MATERIAL SHEET

[75] Inventor: Hirofumi Sugikawa, Toyonaka, Japan

[73] Assignee: Katayama Special Industries Ltd., Osaka-Fu, Japan

[21] Appl. No.: 09/258,866

[22] Filed: Feb. 26, 1999

Related U.S. Application Data

[62] Division of application No. 09/108,120, Jul. 1, 1998, abandoned, which is a division of application No. 08/563,456, Nov. 28, 1995, abandoned.

[30] Foreign Application Priority Data

Nov. 28, 1994 [JP] Japan ..................... 6-293286

[51] Int. Cl.[7] ........................................ B22F 3/10
[52] U.S. Cl. ............................... 419/2; 419/24
[58] Field of Search .................................. 419/2, 24

[56] References Cited

U.S. PATENT DOCUMENTS

| | | | |
|---|---|---|---|
| 3,926,671 | 12/1975 | Gutjahe et al. | 136/29 |
| 5,294,319 | 3/1994 | Kaczur et al. | 204/290 R |
| 5,677,088 | 10/1997 | Kobayashi | 429/235 |
| 5,766,789 | 6/1998 | James et al. | 429/44 |

*Primary Examiner*—Daniel J. Jenkins
*Attorney, Agent, or Firm*—Sughrue, Mion, Zinn, Macpeak & Seas, PLLC

[57] ABSTRACT

Metallic powders are extruded from a spinning nozzle to form metallic fibers each having a diameter of 1.0 $\mu$m–100 $\mu$m. Then, the resultant metallic fibers are formed into a sheet having a porous structure such as a nonwoven sheet, or the like. Thereafter, the sheet is sintered. An active substance is applied to pores of a resultant porous metallic sheet to be used as an electrode substrate of a battery. The metallic fibers are three-dimensionally intertwined with each other by using fluid at a high pressure and a high speed and then, surfaces of the metallic fibers intertwined with each other is fused under pressure at a temperature lower than the melting point of the metal to directly connect intersections of the intertwined metallic fibers so as to form a porous metallic sheet.

8 Claims, 20 Drawing Sheets

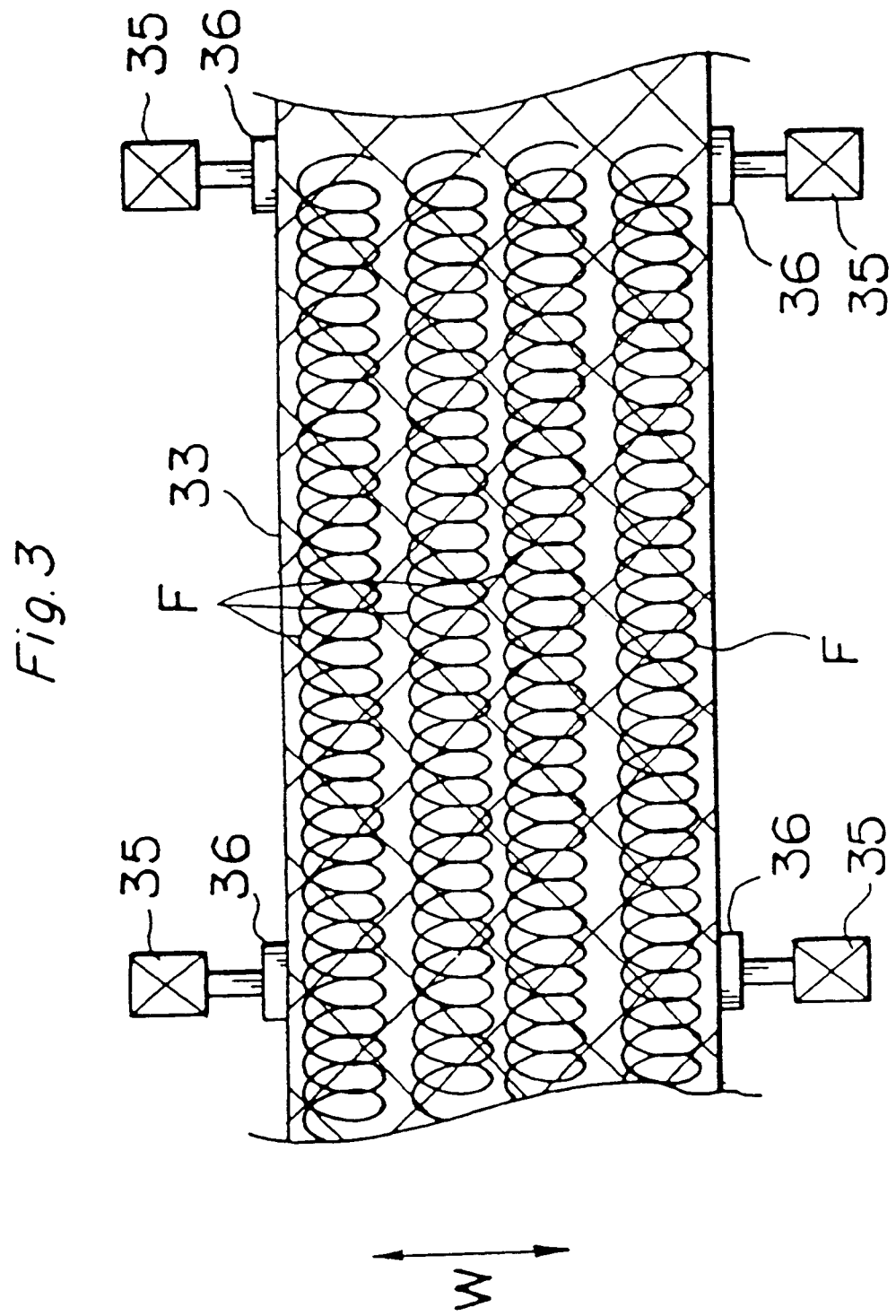

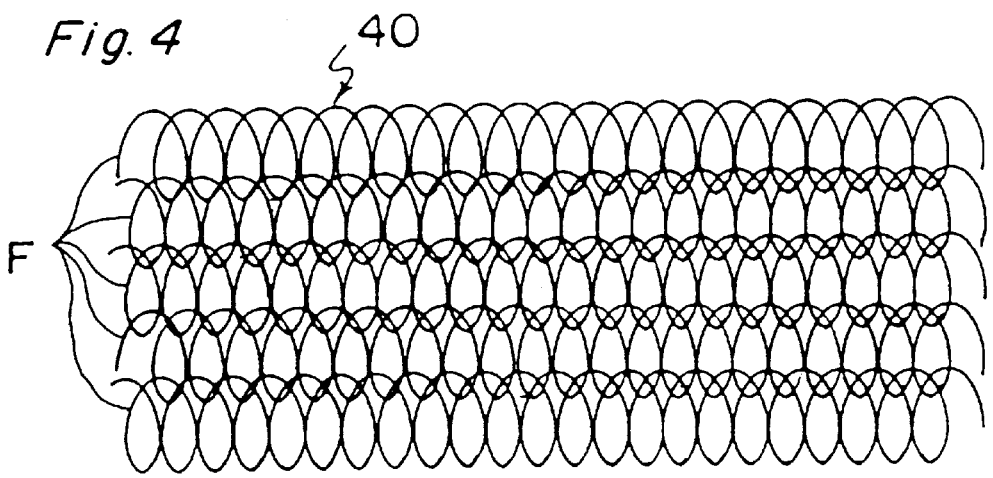
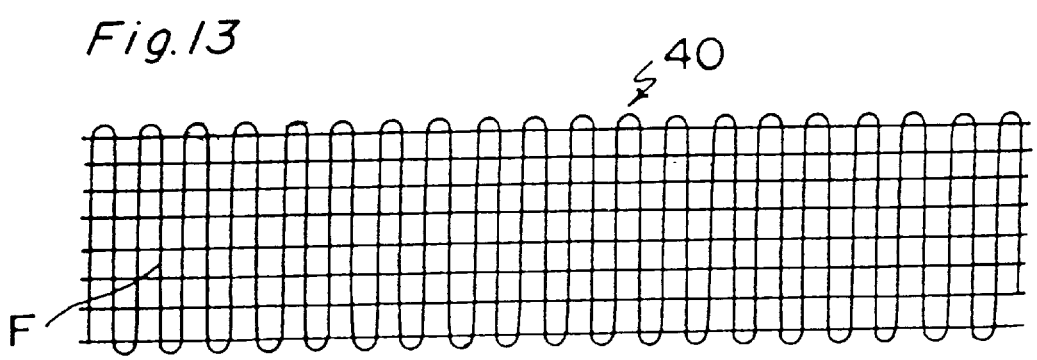

POROUS METALLIC SHEET USED AS AN ELECTRODE SUBSTRATE OF A BATTERY AND METHOD OF MANUFACTURING THE POROUS MATERIAL SHEET

This is a divisional of application Ser. No. 09/108,120 filed Jul. 1, 1998, now abandoned, which is a divisional of application Ser. No. 08/563,456 filed Nov. 28, 1995, now abandoned the disclosure of which is incorporated herein by reference.

BACKGROUND OF THE INVENTION

1. Field of the Invention

The present invention relates to a porous metallic sheet to be used as a substrate of a battery electrode; an electrode plate of the battery; and a method of manufacturing the porous metallic sheet and the electrode plate. More particularly, the present invention relates to a porous metallic sheet to be used as the substrate of positive and negative plates of a nickel hydrogen battery, a nickel cadmium battery, a primary lithium battery, a secondary lithium battery, and the like; and an electrode plate formed by applying an active substance to the porous metallic sheet; and a method of manufacturing the electrode plate and the porous metallic sheet.

2. Description of Related Art

Heretofore, as the substrate of the electrode plate comprising positive and negative electrode plates of the nickel hydrogen battery and the nickel cadmium battery, principally, a nickel-plated punched iron metal on which pores have been formed by a press is used. The electrode plate is formed by applying an active substance to the punched metal. A cylindrical battery accommodates the belt-shaped positive and negative electrode plates coiled via a separator, while a rectangular solid battery accommodates the positive and negative electrode plates laminated one on the other via the separator.

As the substrate of the electrode plate comprising the positive and negative electrode plates of the primary lithium battery, a metallic plate (SUS, Ti) formed into a lath net is mainly used. An active substance is applied to the lath net to form the electrode plate. In the case of a secondary lithium battery, the positive plate is formed by applying the active substance in a required thickness to both surfaces of a metallic core made of an aluminum foil, whereas the negative plate is formed by applying the active substance in a required thickness to both surfaces of a metallic core made of a copper foil.

In recent years, a foamed sheet made of resin, a nonwoven cloth made of resin, and a mesh sheet made of resin are chemically plated to allow them to be conductive and then, electrically plated, and then, resin removal and sintering operations are performed to form a porous metallic sheet to use it as the substrate of the electrode plate of the nickel hydrogen battery, the nickel cadmium battery, and the primary lithium battery.

The punched metal used as the substrate of the electrode plate of the nickel hydrogen battery and the like has the following disadvantages:

(1) Portions to be formed into pores are cut off when the punched metal is punched by a press. For example, when the percentage of pores is 50%, half of the material is lost. As such, the production cost is high.

(2) It costs high to operate a press to be used to form pores. (3) Because the pores are two-dimensional, the percentage of pores is 50% at most. Thus, there is a limitation in the amount of an active substance to be applied to the pores.

(4) In order to increase the capacity of a battery, it is preferable to use a thin substrate having a high percentage of the pores so as to apply a large amount of active substance to the pores. But there is a limitation in the percentage of pores for the reason described above. Further, in order to reduce the thickness of the substrate from 60–80 μm to less than 60 μm, material cost is high and the punched metal is plated at a low efficiency. That is, processing cost is high. In addition, if the substrate is thin, it is easily deformed or a burr is easily formed thereon in forming the pores by the press.

In the case of the metallic plate processed into the lath net used as the substrate of the electrode of the primary lithium battery, the metallic plate is deformed and warped due to stress locally concentrated in processing the metallic plate into the lath net. That is, the metallic plate becomes unflattened. The lath net deformed and warped is corrected by a leveler without changing the original size in order to produce the substrate at a low cost. Then, the active substance is applied to the lath net. Then, the lath net is cut to a plurality of pieces having the size which meets the battery standards. At this time, the deformation generated when the metallic plate has been processed into the lath net is regenerated and burrs are likely to occur. As a result, when the lath net is coiled via a separator, there is a possibility that the burr and the deformation cause leakage. It is preferable for the electrode of the primary lithium battery to have a high percentage of pores, so long as the lath net has a preferable strength. But structurally, the lath net should not have the percentage of pores not more than 63%. There is another problem that the higher the percentage of pores is, the higher material cost is.

The porous metallic sheet formed by plating a base porous sheet made of resin, successively burning out and sintering the plated material sheet used as the substrate of the electrode plate developed to replace the punched metal and the lath net has a high percentage of pores and allows a great amount of active substance to be applied to pores thereof. But it is necessary to chemically and electrically plate the porous sheet made of resin and thus perform a complicated process. Hence, the plated porous metallic sheet is produced with an unfavorable productivity. Further, chemicals such as plating liquid is used and high power is consumed. Therefore, producing cost is high. In addition, the management of treatment liquid and countermeasure against pollution are required.

Furthermore, after the surfaces of organic fibers are chemically plated with a conductive substance and the conductive substance is electrically plated in a thickness of 25 μm–50 μm. As a result, the outer diameter of each fiber (mixture fiber) consisting of an organic fiber and plated metal becomes large. When the organic fiber is burnt out continuously the plated metal is sintered, the portion of the fiber occupied with the organic fiber becomes hollow. As a result, a resultant metallic fiber is annular and has a large diameter. That is, the resultant porous metallic sheet has a structure in which pores are surrounded with a framework made of metallic sleeves having cavities.

In order to use the porous metallic sheet as an electrode plate, the active substance is applied to pores of the plated porous metallic sheet. But it cannot be applied to the cavities of the sleeves. Thus, the cavities are reactive portions in the electrode plate. Further, because the outer diameter is each of the sleeves is large, the plated porous metallic sheet has a small volume of the pores surrounded with the metallic cylinders. Therefore, a large amount of the active substance cannot be applied to the plated porous metallic sheet.

When the sheet structure composed of the organic fibers, for example, a nonwoven sheet composed of the organic fibers is electrically plated after it is allowed to be conductive, metal is deposited thickly on the surface of the nonwoven sheet while it is not deposited much in the interior (center portion in thickness direction of sheet), i.e., the deposition amount of the metal in the interior is about half as much as that in the surface. That is, it is difficult to make the amount of a metallic framework on the surface equal to that on the entire sheet.

In order to use the porous metallic sheet as the substrate of the electrode of a battery, as described above, the active substance is applied to pores and thereafter, it is pressurized to adjust the thickness thereof to the standard one. It is easy to apply the active substance to the porous metallic sheet having a large thickness and a high percentage of pores.

According to the conventional art, it is not easy to produce a thick porous metallic sheet formed by coating the surface of the nonwoven sheet made of organic fibers with a conductive substance and electrical plating.

That is, supposing that in the conventional nonwoven sheet comprising the organic fibers, quantity of fiber is 40–50 g/m$^2$; quantity of resin binder is 20 g/m$^2$; the total weight is 60–70 g/m$^2$; and the percentage of pores is 95%, the maximum thickness thereof is 2.5 mm–3.5 mm. After the nonwoven sheet having the above thickness is subjected to electric conduction treatment, electric plating, resin burning out, and sintering, it is difficult to produce a porous metallic sheet having a thickness 1.6 mm.

Further, the conventional nonwoven sheet is produced by using short organic fibers. The short organic fibers are knitted into the nonwoven sheet by a spinning carding machine and resin binder is used to connect the short organic fibers to each other. In the nonwoven sheet composed of the organic fibers thus produced, resin binder (R) is collected at the intersections of organic fibers (f), thus forming lumps at the intersections, as shown in FIG. 28.

When the nonwoven sheet is subjected to electric conduction treatment and electrical plating, the diameters of fibers are large at the intersections. Thus, when the organic fibers are subjected to resin burning out and sintering operations, the resin lumps become hollow at the intersections. Thus, as described above, the active substance cannot be applied to the hollow portions, and thus the hollow portions are unconductive and further, the diameters of the fibers are great at the intersections. Accordingly, the nonwoven sheet has a small volume of pores. Thus., a large amount of active substance cannot be applied to the porous metallic sheet.

The higher the percentage of pores is, the greater the active substance can be applied to the porous metallic sheet to be used as the electrode plate, and thus, the electrode plate is allowed to have a long life. The smaller the area of each pore is, the greater the area of contact between metal and the active substance is. That is, the higher the percentage of pores is and the smaller the area of each pore is, the more favorable the performance of the electrode plate is.

According to the conventional art, in order to reduce the areas of pores in producing the conventional porous metallic sheet by plating the surface of the organic fibers, it is necessary to make the dense meshes of the sheet comprising the organic fibers small. But the surface of each organic fiber is plated and the organic fibers are burnt out. As a result, the resultant porous metallic sheet has a small percentage of pores and many cavities formed as a result of the removal of the organic fibers.

Aluminum foils and copper foils are hitherto used as the substrate of the electrode plate of the secondary lithium battery. The active substance is applied to both surfaces of each solid metallic foil in the same thickness while the metal foil is being drawn. But because the metallic foil has a small strength, the producing line cannot be operated at a high speed. Further, it is not easy to apply the active substance to upper and lower surfaces of the metallic foil in the same thickness. Actually, the thickness of the active substance applied to the upper surface of the foil is often different from that applied to the lower surface thereof. As a result, the active substance is not partly conductive in charge and discharge times and hence the active substance cannot be utilized efficiently in a battery case.

The substrate of the electrode plate which satisfy all the following requirements has not been provided.

(a) The substrate has a high conductivity: The internal resistance of a battery is set to a small value so as to perform electricity-collection action smoothly.

(b) The substrate has a high percentage of pores: A large amount of active substance can be applied to the substrate so as to increase the capacity of the battery.

Even though a large amount of active substance can be applied to the substrate, electricity-collection action cannot be performed smoothly when the area of contact between metal and the active substance is small. Thus, it is necessary for the substrate to have a high percentage of pores and a large area of contact between the metal and the active substance.

(c) The thickness of the substrate is small and the substrate has a great tensile force: If the substrate is thin, the battery can be allowed to have a high performance by accommodating a large amount of substrate in the battery case.

(d) The substrate is provided with a electricity-collection lead and produced in a required configuration at a low cost.

SUMMARY OF THE INVENTION

The present invention has been made in view of the above-described conventional problems, and it is an object of the present invention to provide a porous metallic sheet to be used as an electrode substrate of a battery having the above-described requirements; an electrode plate formed by applying an active substance to the porous metallic sheet; and a method for manufacturing the porous metallic sheet and the electrode plate.

It is another object of the present invention to reduce manufacturing cost by eliminating conduction treatment such as chemical plating and the management of treating solution and by saving the rate of electric power consumption.

In order to achieve the above-described objects, according to a first invention, there is provided a porous metallic sheet, to be used as an electrode substrate of a battery, having a porous fibrous structure or a three-dimensional net-shaped structure in which a framework surrounding pores of the porous fibrous structure or those of the three-dimensional net-shaped structure is formed of metallic fibers made of metallic powders.

The porous fibrous structure consists of a nonwoven sheet, a woven sheet, a knitted sheet, a felt sheet, a screen-shaped sheet, an expanded sheet, a net-shaped sheet. The three-dimensional net-shaped structure consists of a foamed sheet, a spongelike sheet, a honey-comb-shaped sheet.

As described above, metallic fibers made of metallic powders are formed into a sheet having the porous fibrous structure consisting of a nonwoven sheet, a woven sheet, a knitted sheet, and the like or into the three-dimensional net-shaped structure. The method of forming the metallic fibers into these structures eliminate plating process.

Heretofore, the porous metallic sheet is formed by plating organic fibers and then burning out the organic fibers. Thus, cavities to which the active substance cannot be applied are generated in a resulting sheet. According to the present invention, because a framework surrounding pores consists solid metallic fibers, cavities to which the active substance cannot be applied are not generated in the porous metallic sheet. That is, a large amount of active substance can be applied to the porous metallic sheet.

Further, the conventional metallic fibers are hollow, whereas the metallic fibers according to the present invention are solid. Thus, the metallic fibers according to the present invention can be allowed to have small diameters, thus increasing the percentage of pores. Accordingly, a great amount of active substance can be applied to the porous metallic sheet.

That is, supposing that the same spinning nozzle is used, according to the conventional method, the surfaces of the organic fibers extruded from the spinning nozzle are plated. Thus, the outer diameters of organic fibers become large. On the contrary, according to the present invention, fibers extruded from the spinning nozzle are metallic fibers. Therefore, it is unnecessary to plate the surface of the metallic fiber. When the porous sheet made of the metallic fibers is subjected to burning out and sintering operations, the diameters of the metallic fibers becomes small.

At a high percentage of pores, a large amount of active substance can be applied to the porous metallic sheet per area.

The performance of the battery cannot be improved even though large area pore is formed to apply a large amount of active substance thereto. That is, the performance of the-battery can be improved when the gap between metallic fibers (framework) which flows electricity to the active substance is small and the area of contact between the metallic fibers and the active substance is great.

Because the percentage of pores in the porous metallic sheet of the present invention is as same as that of the conventional sheet, the porous metallic sheet of the present invention can be composed of a large number of metallic fibers than the conventional sheet. Therefore, in the metallic sheet of the present invention, the gap between the metallic fibers is allowed to be small and in addition, the area of contact between the metallic fibers and the active substance is great. This structure increases the electric conduction performance of the active substance, thus improving the performance of the electrode plate.

Further, according to the present invention, because metallic fibers are woven or knitted and intertwined with each other to form the sheet having the porous fibrous structure, metallic frameworks are present uniformly on the surface and the interior of the sheet. On the other hand, according to the conventional art, when a porous metallic sheet is formed by electrically plating the organic fibers, the amount of metal which deposits on the organic fibers located in the interior of the sheet is about half as small as that of metal which deposits on those located on the surface of the sheet. The porous metallic sheet of the present invention does not have the disadvantage.

The diameters of the metallic powders are in the range from 0.1 $\mu$m to 5 $\mu$m. As the metallic fiber made of the metallic powders, continuous or long metallic fibers having diameters 1.0 $\mu$m–100 $\mu$m are preferable. The smaller the diameter of the fiber is, the higher the percentage of pores is and further, the area of one pore can be reduced without decreasing the percentage of pores in the sheet.

The porous metallic sheet made of long or continuous metallic fibers have a tensile force 1.5–3 times as great as that of the porous metallic sheet produced by the conventional method, namely, made of electrically plating the organic fibers and then burning out and sintering them. Accordingly, because the porous metallic sheet has a high tensile force, it can be drawn at a high speed while it is being fed for applying the active substance.

As necessary, the surface of the metallic fibers may be electrically plated in the present invention. The plating increases the strength of the porous metallic sheet and its tensile force, thus allowing the active substance to be applied to the metallic fibers at a higher speed.

The metallic powders consist of metals, alloys, oxides of metals, or oxides of alloys. The metallic powders also consist of one kind of the above metallic powders or a mixture of the above metals, alloys, oxides of metals, and oxides of alloys.

As the metallic powders, Ni, Cu, Al, Ag, Fe, Zn, Sn, In, Ti, Pb, V, Cr, Co, oxides of these metals, alloys of these metals, and mixtures of these metals are preferably used. In this manner, metallic fibers consisting of a mixture of the metallic powders can be formed.

Preferably, the porous metallic sheet, to be used as the electrode substrate of a battery, formed of the metallic fibers made of metallic powders has percentage of pores at more than 90%, and its thickness is set to 5 $\mu$m–5000 $\mu$m. In particular, the thickness of the porous metallic sheet in the present invention can be formed more thickly than the conventional one. That is, the maximum thickness of the conventional nonwoven sheet comprising the plating organic fibers is 2.5 mm–3.5 mm as described previously, when the quantity of fiber is 40–50 g/m$^2$; the quantity of resin binder is 20 g//m$^2$; the total weight is 60–70 g/m$^2$; and the percentage of pores is 95%. After the organic sheet having the above thickness is subjected to electric conduction treatment, electric plating, resin removal, and sintering, a thickness of a resulting porous metallic sheet reduces to 1.6 mm. It is difficult to apply the active substance to the porous metallic sheet when it has such a small thickness.

On the other hand, because the porous metallic sheet made of metallic fibers in the present invention has a high rigidity and elasticity, it can be allowed to have a thickness as great as 3.3 mm–5.0 mm. After the porous metallic sheet is burnt to remove resin binder and sintered the metal, the weight thereof is decreased in a small extent. After the porous metallic sheet is passed through a pair of skin pass rolls to make the thickness thereof uniform, the porous metallic sheet has a thickness more than 1.6 mm. Accordingly, the active substance can be applied to the porous metallic sheet in the present invention more easily than the conventional one. After the application of the active substance to the porous metallic sheet, the porous metallic sheet is pressurized to obtain the predetermined thickness, namely, ½ to ⅓ of the thickness of an original one.

Preferably, a plurality of porous metallic sheets are laminated one on the other.

Further, the porous metallic sheet in the present invention may be laminated on a porous metallic sheet formed by plating a porous sheet made of organic or inorganic substance proposed and/or a conductive metallic foil having holes formed thereon, so as to form a porous metallic sheet to be used as an electrode substrate of a battery. The organic substance consists of porous sheet such as a foamed sheet, a mesh sheet or a nonwoven sheet made of resin, the porous sheet is plated and then, burnt to remove is resin and then sintered.

According to a second invention, a porous metallic sheet to be used as an electrode substrate of a battery has a porous fibrous structure or a three-dimensional net-shaped structure in which a framework surrounding pores of the porous fibrous structure or those of the three-dimensional net-shaped structure is formed of metallic fibers which are intertwined with each other and the surface of which are fused to connect the metallic fibers with each other.

In the porous metallic sheet according to the second invention, the surfaces of the metallic fibers at the points of intersection are fused with each other under pressure at a temperature lower than the melting point. According to the conventional method, organic binder is used to connect the metallic fibers with each other to form them into a sheet. When the organic binder is burnt out and sintering processes, the portion of a mixture fiber occupied with the organic binder becomes hollow. As a result, a resultant metallic fiber becomes annular and has a large diameter. According to the present invention, the metallic fibers are connected with each other without using the organic binder. Thus, no hollow portions are generated in the metallic fibers.

As the metallic fibers, Ni, Cu, Al, Ag, Fe, Zn, Sn, In, Ti, Pb, V, Cr, Co, oxides of these metals, alloys of these metals, and mixtures of these metals are favorably used to form the metallic fibers. Stainless steel and titanium are more favorably used because these substances are corrosion-resistant. As the stainless steel, SUS 304, SUS316 containing molybdenum, and SUS 444 containing niobium and molybdenum are preferably used. As metals to compose metallic fibers of the electrode substrate to be used as the positive electrode plate of a secondary lithium battery, aluminum, titanium, stainless steel, and carbon are used. As metals to compose metallic fibers of the electrode substrate to be used as the negative electrode plate thereof, copper, nickel, stainless steel, and carbon are used.

The metallic fibers may consist of continuous metallic fibers made of the metallic powders; fine metallic fibers formed by convergent-drawing method, metallic fiber-spinning method or metallic foil-cutting method; or metallic fibers formed by chattering-vibration method for cutting a metallic bar or a coiled metallic foil.

Because the metallic fibers can be intertwined with each other three-dimensionally, short metallic fibers are preferably used to form the porous metallic sheet. In addition, continuous or long metallic fibers may be used to form the porous metallic sheet.

In the porous metallic sheet, because the metallic fibers are intertwined with each other three-dimensionally and both ends thereof are also connected with each other, the ends do not appear on the surface of the porous metallic sheet. Thus, when the porous metallic sheet is coiled via a separator after the active substance is applied thereto, leak rarely occur.

Preferably, the percentage of pores of the porous metallic sheet is 70%–99% in the case of the substrates of batteries other than that of a secondary lithium battery, while the percentage of pores of the porous metallic sheet is 30%–60% in the case the substrate of the secondary lithium battery.

Preferably, the diameters of the metallic fibers are 1 $\mu$m–100 $\mu$m, whereas those of short metallic fibers are 1 $\mu$m–60 $\mu$m. It is also preferable to mix the metallic fibers of different lengths to form the porous metallic sheet. Preferably, the thickness of the porous metallic sheet is 5 $\mu$m–5000 $\mu$m.

The porous fibrous structure or the three-dimensional net-shaped structure composed of the metallic fibers has fine pores, further it is preferable to form a great number of through-holes therein in addition to the fine pores. The through-holes are formed to be circular, rectangular or rhombic, thus allowing the porous fibrous structure or the three-dimensional net-shaped structure to be a porous metallic sheet as a punched sheet, net-shaped sheet or lath-shaped sheet.

Belt-shaped portions to be used as a lead of an electrode plate are formed at regular intervals in except a region, in which the through-holes are formed.

In the porous metallic sheet to be used as the electrode substrate of a battery in the second invention, intersections of the metallic fibers intertwined with each other are fused to connect them with each other firmly at many points. Thus, the tensile force and conductivity of the porous metallic sheet are as high as those of a solid metallic foil. Thus, as the porous metallic sheet has a high tensile strength, the active substance can be applied thereto at a high speed while it is being fed. Hence, the porous metallic sheet can be manufactured at a high productivity. Further, the pores and the through-holes are not clogged, and the active substance can be prevented from dropping from the pores and the through-holes, because the porous metallic sheet has a three-dimensional structure.

Further, the percentage of pores of the porous metallic sheet in accordance with the second invention and the thickness thereof can be controlled in a range of 20–97% and 5–5000 $\mu$m, respectively, similarly to the porous metallic sheet in accordance with the first invention. That is, the thickness and the percentage of pores can be adjusted by controlling the density of the metallic fibers. Further, the percentage of pores including the through-holes can be easily adjusted by controlling the percentage of the through-holes. For example, the percentage of pores can be increased up to 99% so as to apply a large amount of active substance to the porous metallic sheet. Furthermore, because the porous metallic sheet is allowed to have a smaller thickness compared with a conventional punched metal sheet or lath net sheet, the porous metallic sheet can be coiled around an electrode plate in more turns than the conventional punched metal sheet or lath net sheet, thus increasing the capacity of the battery.

Further, the porous metallic sheet in accordance with the first and second inventions are made of fine metallic fibers and thus flexible. In particular, unlike the conventional punched metal sheet or lath net sheet, the flexibility prevents an external force from being locally applied to the. porous metallic sheet in a process of cutting it to a predetermined size after the active substance is applied thereto. Thus, the porous metallic sheet is hardly deformed and further, burr is not generated, which prevents leak from being generated when the porous metallic sheet serving as an electrode plate is accommodated in a battery.

Preferably, similarly to the porous metallic sheet in accordance with the first invention, the porous metallic sheet in accordance with the second invention is used by laminating a plurality of porous metallic sheets one on the other as necessary. It is possible to over laid on the porous metallic sheet according to the first and second invention with porous metallic sheet formed by a punched conductive metallic foil, an plated organic porous sheet or an inorganic porous sheet, so as to use the resultant porous metallic sheet as the electrode substrate of the battery.

The present invention provides an electrode plate of a battery formed by applying the active substance to the porous metallic sheet in accordance with the first and second inventions. The electrode plate is used as the electrode plate of a nickel hydrogen battery, a nickel cadmium battery, a primary lithium battery or a secondary lithium battery.

More specifically, the electrode plate of the nickel hydrogen battery and the nickel cadmium battery is formed by applying the active substance to the porous metallic sheet made of nickel fibers.

Cavities to which the active substance cannot be applied are not present in the electrode plate of the battery according to the present invention. Thus, a large amount of active substance can be applied and further, the area of contact between the applied active substance and the metallic fibers (framework) is great, which improves the performance of the battery.

The present invention is intended to provide a method of manufacturing a porous. metallic sheet, of the first invention, to be used as an electrode substrate of a battery. The manufacturing method comprises the steps of forming a mixture by kneading metallic powders and resin binder; spinning metallic fibers by extruding the mixture from a spinning nozzle; and forming the spun metallic fibers into a porous fibrous structure or a three-dimensional net-shaped structure. Preferably, the porous fibrous structure or the three-dimensional net-shaped structure are burnt to remove the resin binder and then sintered.

Resin binder is required to have a required viscosity in spinning process, and thus the following substances having the required viscosity are preferably used: polypropylene, polyester, polyethylene, polyacrylonitrile, polyvinyl polymer, polyimide, nylon polymer, polyurethane, cellulase, and polymer formed of organic fiber.

Favorably, the mixing ratio between the metallic powder and the resin binder is 70%–97% and 30%–3%, and more favorably, 85%–97% and 15%–3%.

Because the metallic powder is mixed with the resin binder at percentages as high as 70%–97%, it is not always necessary to plate a resulting sheet in a later process, but the resulting sheet may be plated as necessary.

In order to easily spin and draw the mixture of the resin binder and the metallic powder contained at a high percentage to form fine fibers, the mixture is extruded from the center of a spinning nozzle to form a core, while the resin is extruded from the periphery of the center of the spinning nozzle to form a sheath. In this manner, the mixture is extruded from the spinning nozzle as a compound metallic fiber consisting of the core and the sheath surrounding the core.

The mixture of the resin binder and the metallic powder is extruded from a plurality of discharge portions to form a plurality of cores, and the resin is extruded to the spaces between the cores. In this manner, the mixture is extruded from the spinning nozzle as a compound metallic fiber consisting of a resin portion and a plurality of scattered cores surrounded with the resin portion.

Further, the mixture of the resin binder and the metallic powder is extruded from the spinning nozzle, with the mixture being in contact with resin having a melting point different from the resin contained in the mixture to form a compound metallic fiber. The resultant fibers are curled when they are cooled. This method allows the spun fibers to be curled and a thick sheet to be composed of the curled metallic fibers.

In the above-described methods, metallic powders and the resin binder are mixed with each other, but fibers may be formed of only metallic powders by extruding them from the spinning nozzle. The resultant metallic fibers are formed into the porous fibrous structure or the three-dimensional net-shaped structure so as to use them as the electrode substrate of the battery. In this case, pressurizing force to be applied to the metallic powder is set at about 30–70 times, preferably about 50 times as great as is that to be applied to the mixture of the metallic powders and the resin binder. Because the resin binder is not used in this method, it is not necessary to burn out for removing the resin binder and hence they are only sintered.

Preferably, the porous fibrous structure or the three-dimensional net-shaped structure is burnt out at 800° C.–1200° for about two minutes to remove the resin binder and then sintered at 1000° C.–1300° for about 2–10 minutes.

Continuous metallic fibers extruded from the spinning nozzle are curved continuously into a coiled configuration by movement of blowing air.

As described above, air is blown to the continuous metallic fibers extruded from the nozzle or air is sucked to bend the metallic fibers extruded from the nozzle into a continuously curved coil spring-configuration. Because the metallic fibers are curved, they are rigid and elastic and thus a sheet having a great thickness can be formed in correspondence to the curved amount.

Further, a great number of coiled continuous metallic fibers is fed to a horizontal conveyor, and the conveyor is vibrated widthwise to intertwine the continuous metallic fibers with each other to form a sheet having a porous structure.

The above-described method allows the sheet having a porous structure to be easily formed. Further, the density of fibers can be easily altered by adjusting the degree of the widthwise vibration of the conveyor and the feeding speed of the conveyor so as to form the porous sheet, having a required percentage of pores, made of the metallic fibers.

A method of manufacturing a porous metallic sheet to be used as an electrode substrate of a battery according to the second invention comprises the steps of: placing a web comprising metallic fibers on a supporter; injecting fluid having a high pressure and a high speed to the web to intertwine the metallic fibers with each other to form the metallic fibers into a three-dimensional sheet; and heating the three-dimensional sheet comprising intertwined metallic fibers at a pressure and at a temperature lower than the melting point of the metallic fibers so as to fuse the surfaces of the fibers with each other at the point of intersection.

The three-dimensional sheet comprising the intertwined metallic fibers is heated under pressure in a nonoxidizing atmosphere, and reduction is performed in an atmosphere in which $H_2$ is present.

As the supporter on which the web is placed, a screen or the like which allows the passage of fluid therethrough at a high pressure and a high speed is used.

Preferably, high pressure-columnar water current is used as the fluid having the high pressure; the high pressure-columnar water current is injected to the web, in a direction perpendicular thereto, placed on the supporter so as to form a metallic fibers-intertwined sheet; the sheet is dehydrated and dried; and the sheet is heated at the pressure.

Convexes are formed on the upper surface of the supporter so as to form through-holes on the metallic fibers-intertwined sheet in correspondence to the locations of the convexes. When fluid is injected to the web on the conic or pyramidal convexes at a high pressure and a high speed, the metallic fibers of the web placed on the convexes flow downward from the upper end of the convex to the flat portion of the upper surface of the supporter along the peripheral surface of the convex. In this manner, the through-holes are formed at the portions corresponding to the convex.

A plurality of convexes are formed at regular intervals to form a large number of circular, rectangular or rhombic through-holes corresponding to the configuration of the convexes on the metallic fibers-intertwined sheet. Consequently, the sheet becomes as like as a punched metallic sheet, net-shaped sheet or lath-shaped sheet.

Belt-shaped portions are formed of the supporter at predetermined intervals in a region in which the convexes are not formed, so as to form portions for providing leads of an electrode plate on the metallic fibers-intertwined sheet in correspondence to the belt-shaped portions.

That is, owing to the formation of the convex on the supporter on which the web is placed, the metallic fibers-intertwined sheet can be allowed to have holes of various configurations, and the portions for leads can be formed on the metallic fibers-intertwined sheet, simultaneously with the formation of the holes.

Instead of the method of using fluid having a high speed and a high pressure, the following method may be adopted. That is, the method comprises the steps of intertwining metallic fibers of a web with each other three-dimensionally by means of a needle punch to form a sheet; and heating the metallic fibers-intertwined sheet at a pressure and at a temperature lower than the melting point of the metallic fibers so as to fuse the surfaces of fibers with each other at the point of intersections.

The following metallic fibers according to the second invention are used: Fine continuous metallic fibers formed by convergent-drawing method, metallic fiber-spinning method or metallic foil-cutting method; short metallic fibers formed by cutting the fine continuous metallic fibers; or short fibers formed by chattering-vibration method for cutting a metallic bar or a coiled metallic foil. These metallic fibers are raveled by a blender and measured by a quantity-measuring feeder, and then, delivered to a carding machine so as to form the web.

In carrying out the above metallic fiber-spinning method, preferably, after forming fibers by extruding a mixture of the metallic powders and the resin binder by using spinning method, the fibers are burnt out and then sintered to remove the resin binder before the resulting continuous fibers are formed into the web. It is possible to use a spinning method of extruding metallic powders (not mixed with resin binder) from the spinning nozzle by applying a great pressure thereto so as to form metallic fibers. Thereafter, the resultant metallic fibers are sintered, namely the burning out process can be omitted.

Preferably, after the porous metallic sheet is heated under pressure, it is passed through a pair of rolls to adjust the thickness thereof.

According to the above-described manufacturing method, the porous metallic sheet having a great number of connection points of metallic fibers can be easily produced by intertwining them with each other three-dimensionally, and the thickness thereof can be adjusted as desired. For example, the porous metallic sheet is allowed to have a thickness as less than 10 $\mu$m. Because the resin binder is not mixed with metallic powders in this method and it is unnecessary to perform resin-removing operation, the porous metallic sheet can be made of metal such as aluminum which is oxidized at a temperature for performing the resin-removing operation and is weakened.

Further, it is possible to heat surfaces of a plurality of the resulting porous metallic sheets laminated one on the other at a temperature lower than the melting point thereof so as to join them to each other.

Further, in producing the porous metallic sheet by using fluid, the fluid is injected to the web placed on the upper surface of the finished porous metallic sheet at a high pressure and a high speed so as to increase the thickness thereof. Further, it is possible to inject fluid at a high pressure and a high speed to the web placed on the upper surface of the porous metallic sheet produced by other methods so as to increase the thickness thereof. The resulting porous metallic sheet laminated with a plurality of sheets are preferably pressed by punch to form through-holes.

According to the method, of the present invention, for manufacturing the porous metallic sheet to be used as the electrode substrate of the battery, conduction treatment process and plating process required by the conventional method in forming organic fibers into the porous metallic sheet can be eliminated. Thus, the problem of waste solution which occurs in plating the porous metallic sheet can be solved. Further, the method of the present invention reduces the rate of electric power consumption, thus greatly reducing the cost.

If it is preferable to increase the strength of the porous fibrous structure sheet or the three-dimensional net-shaped structure produced sheet by the above-described methods, it is possible to electrically plate the sheet. Preferably, after they are electrically plated, sintering operations are carried out.

Even though electrical plating is used to increase the strength of the porous metallic sheet, the amount of metal to be applied to the porous metallic sheet of the present invention is smaller than that to be applied to the conventional porous metallic sheet. Hence, the method of the present invention reduces the rate of electric power consumption, thus greatly reducing the cost.

The present invention is also intended to provide a method for producing a battery electrode formed by applying the active substance to the finished porous metallic sheet. Because the porous metallic sheet produced by the method of the present invention is formed of metallic fibers, it has a high tensile strength. Therefore, the producing line speed can be increased when the active substance is applied thereto while it is being drawn continuously. Hence, the porous metallic sheet can be manufactured with a high productivity.

BRIEF DESCRIPTION OF THE DRAWINGS

FIG. 3 is a partial plan view showing a net conveyor of the manufacturing apparatus;

FIG. 4 is a schematic view showing a porous metallic sheet manufactured by the manufacturing method according to the first embodiment;

FIG. 13 is a schematic view showing another porous metallic sheet in accordance with the present invention;

DETAILED DESCRIPTION OF THE PREFERRED EMBODIMENTS

The embodiments of the present invention are described below with reference to drawings.

Initially, a first method for manufacturing a porous metallic sheet to be used as a substrate of a battery electrode, in accordance with a first invention, composed of metal fibers made out of metallic powder.

Figure 1:
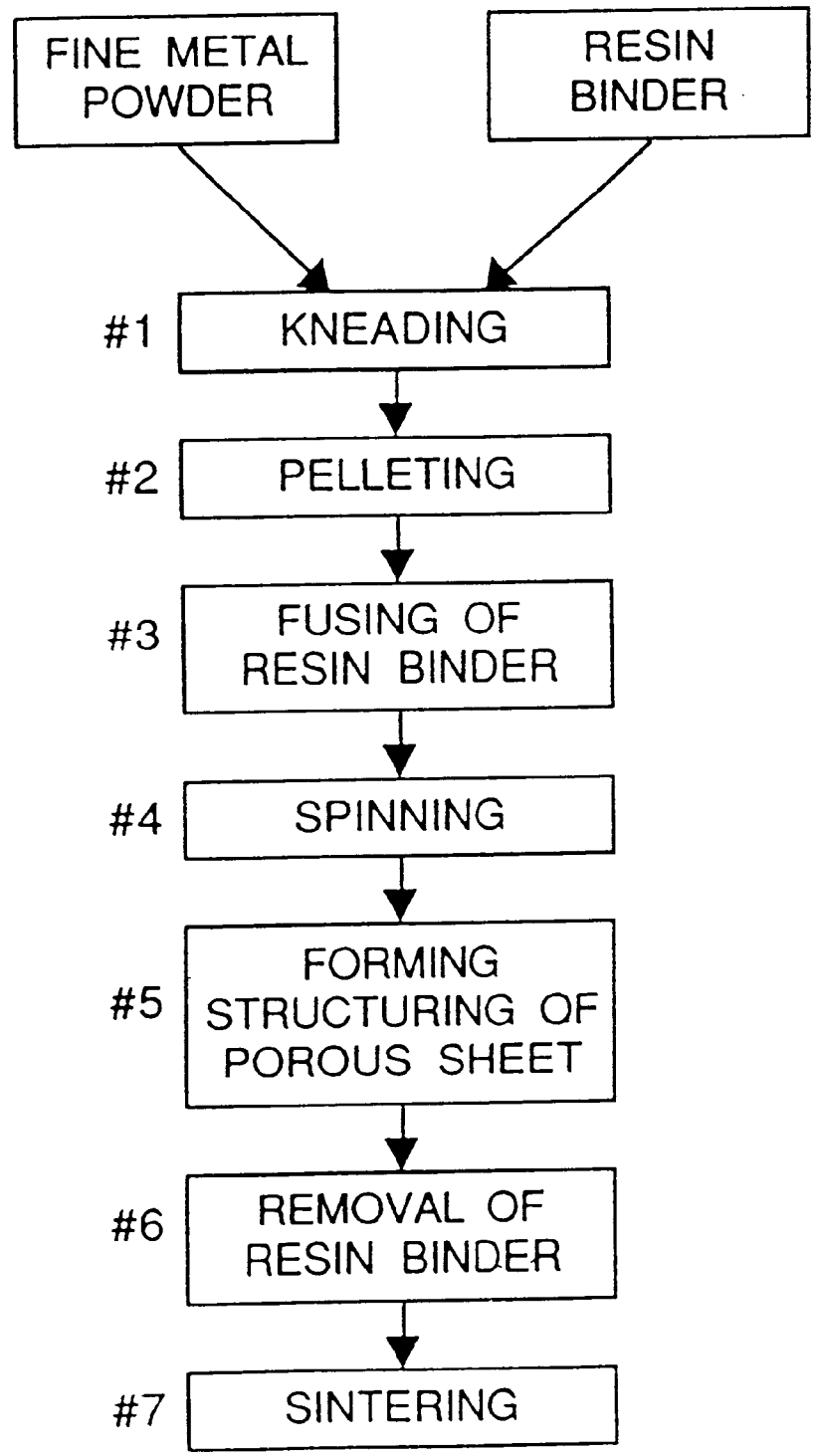
FIG. 1 is a flowchart showing a manufacturing method in accordance with a first embodiment of the present invention.
Figure 2:
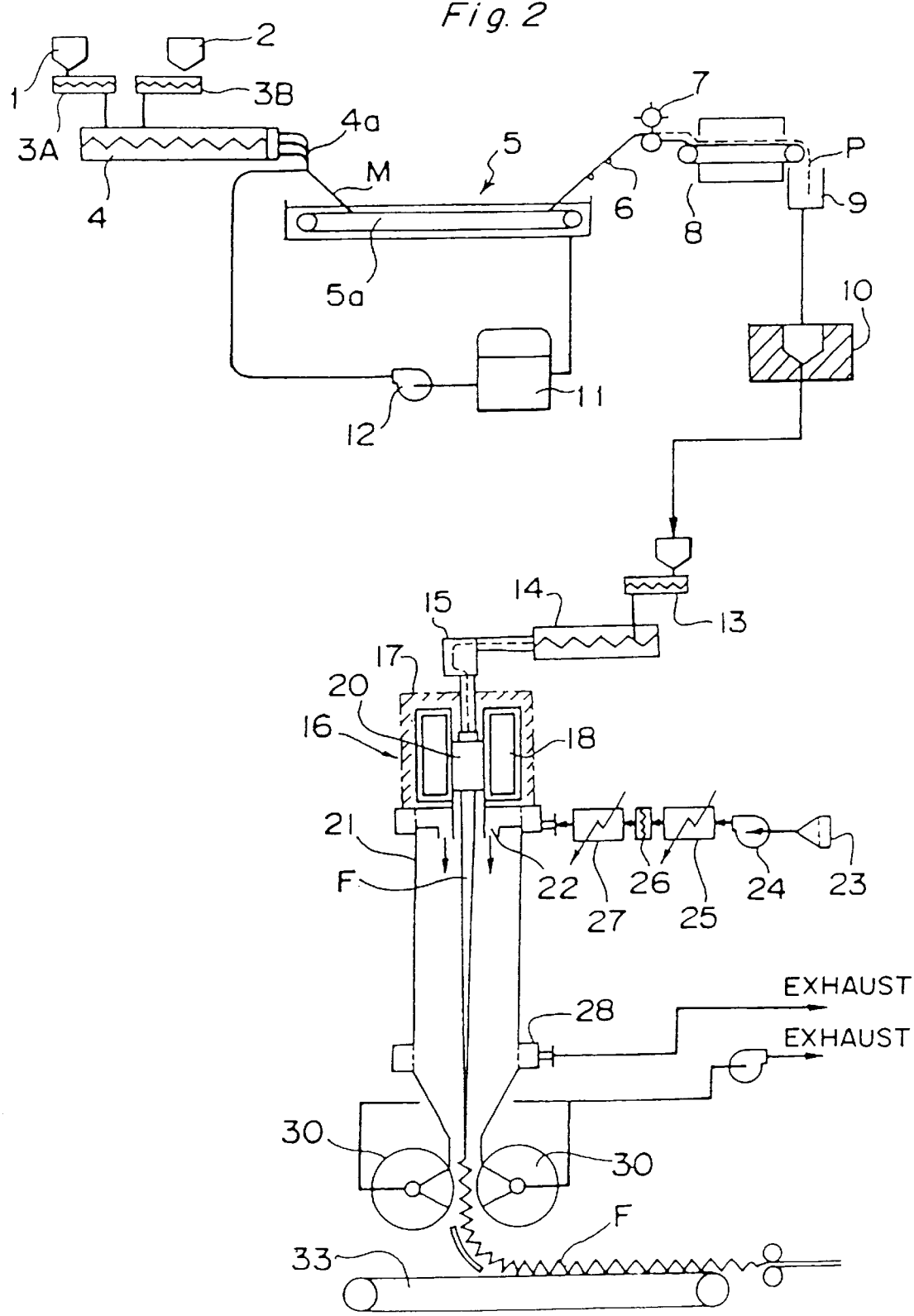
FIG. 2 is a schematic view showing a manufacturing apparatus for carrying out the manufacturing method.

In the first embodiment, in accordance with the flowchart of FIG. 1, metal fibers are made out of metallic nickel powder by using a manufacturing apparatus shown in FIG. 2, and the metallic fibers are formed into a nonwoven porous metallic sheet 40, to be used as a substrate of a battery electrode, shown in FIG. 4.

Using fine nickel powder of 0.1 $\mu$m–5 $\mu$m in diameter as fine metallic powder and powder of nylon 6 as resin binder, 85% of the fine nickel powder and 15% of nylon powder are fed to a kneader 4 from storing containers 1 and 2, respectively after the quantity of the fine nickel powder and that of the nylon powder are measured by quantity-measuring feeders 3A and 3B, respectively so as to knead them at step #1. A mixture (M) comprising the fine nickel powder and the nylon powder kneaded by the kneader 4 is extruded from a nozzle 4a provided at the leading end of the kneader 4 to form the mixture (M) into fibers about 3 mm in diameter. The fiber-shaped mixture (M) is fed inside a cooler 5 by a conveyor 5a to cool it therein.

A pump 12 of the cooler 5 circulates cold water stored in a water tank 11 so as to cool the fiber-shaped (M) with the cold water.

While fiber-shaped mixture (M) taken out from the cooler 5 is being fed by a roller 6, it is cut to form pellets (P) of about 3 mm in length by a cutter 7 at step #2. The pellets (P) are fed through a drier 8 to dry them and then, accommodated in a container 9.

The pellets (P) are supplied to a fusion furnace 10. The pellets (P) are then heated therein at 260° C.–280° C. to fuse the resin binder at step #3. At this time, the fine metallic powder does not melt.

Then, the pellets (P) are fed to an extruder 14 after the quantity thereof is measured by a feeder 13. Then, the mixture of melted resin binder and unmelted metallic powder is fed from the extruder 14 into a spinning nozzle 16 via a filter 15 while a gear pump (not shown) of the extruder 14 is applying pressure thereto.

Large particles and aggregated masses are removed from the mixture by passing it through the filter 15.

A heater 18 circulating heating medium is provided inside a heat retaining wall 17. The heater 18 surrounds a nozzle body 20. The mixture is supplied to the nozzle body 20 via the filter 15 so as to extrude it successively from the nozzle body 20 as fibers. In this manner, the fibers are formed at step #4.

A cooling cylinder 21 is provided below the spinning nozzle 16. An air blowout port 22 is provided at a position proximate to the nozzle body 20 such that the air blowout port 22 is positioned at an upper portion of the cooling cylinder 21 so as to horizontally blow air to the continuous fibers being extruded from the nozzle body 20. In this manner, the fibers are drawn and cooled.

Air sucked by a blower 24 through a filter 23 is fed to the air blowout port 22 through a cooler 25 in which cooling water circulates, a filter 26, and a heater 27 in which vapor circulates so as to adjust the temperature of air to a required one, and then blown to the inside of the cooling cylinder 21.

The air blown to the cooling cylinder 21 is exhausted from an air exhaust port 28 located at the lower end of the cooling cylinder 21.

Figure 8A:
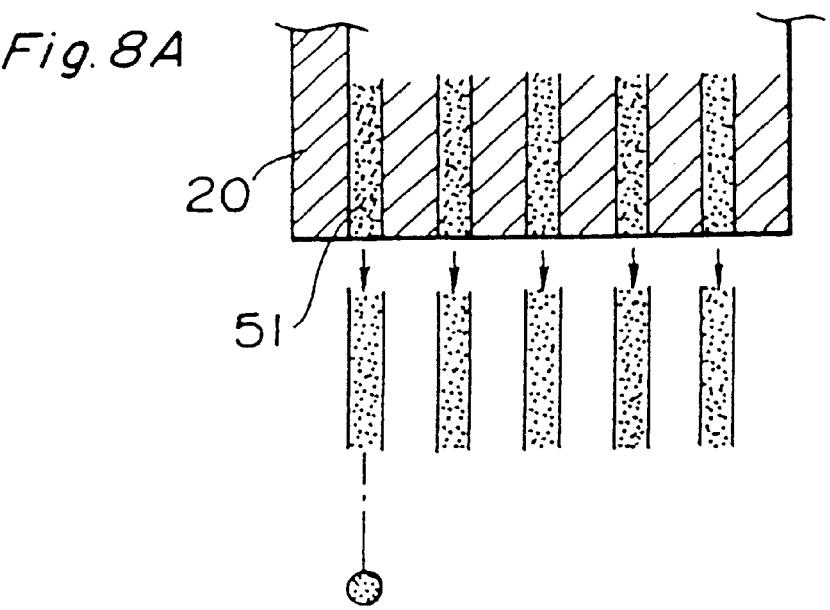
FIGS. 8A through 8D are sectional views showing the body of a spinning nozzle and continuous fibers, in accordance with the present invention, formed by the spinning nozzle.

As shown in FIG. 8A, the nozzle body 20 has a large number of discharge ports 51 through which the fibers (about 40 metallic fibers in the embodiment) are extruded successively in parallel with each other. It is possible to form hundreds to thousands of discharge ports in the nozzle body 20 to extrude hundreds to thousands of continuous fibers at a time.

The diameter of each discharge port 51 of the nozzle body 20 is set to 100 $\mu$m–50 $\mu$m. When the diameter of each discharge port 51 is set to 100 $\mu$m, the diameter of each fiber extruded from the discharge port 51 is about 60 $\mu$m and then reduced to 30 $\mu$m owing to the air blowing-caused drawing thereof. When the diameter of each discharge port 51 is set to 50 $\mu$m, the diameter of each fiber extruded therefrom is about 30 $\mu$m and then reduced to 7 $\mu$m owing to the air blowing-caused drawing thereof.

When each of the fibers which have moved downward with air being blown thereto to draw and cool them in the cooling cylinder 21 is continuously bent into a coil spring configuration by a pair of crimpers 30 of suction drum type positioned below the cooling cylinder 21.

The crimpers 30 suck air and blow it toward the fibers from the left and right sides thereof, thus bending the fibers moving downward. The crimpers 30 do not contact the fibers when it bends them.

The fibers formed in the coil spring configuration by the crimpers 30 are supplied to a net conveyor 33 located horizontally below the crimpers 30 and placed thereon.

As shown in FIG. 3, a large number of continuous fibers bent in the coil spring configuration are arranged in parallel with each other on the net conveyor 33.

The net conveyor 33 is vibrated in the widthwise direction (W). As a result, the fibers arranged in parallel with each other on the net conveyor 33 are vibrated widthwise; intertwined with each other; and bonded to each other at random by means of the resin binder which has mixed to metallic fibers. In this manner, a sheet having a nonwoven porous structure is manufactured at step #5.

As shown in FIG. 3, a means for vibrating the fibers in the widthwise direction (W) comprises a net conveyor-feeding apparatus comprising a driving motor, a pair of pulleys to be driven by the motor, and an endless conveyor 33 spanned between the pulleys. Rods 36 of cylinder 35 reciprocate to vibrate the entire net conveyor 33 in the widthwise direction (W).

Needless to say, other appropriate means may be adopted instead of the above-described vibration means.

Because each fiber of the sheet having a nonwoven porous structure has the coil spring configuration, the sheet having a nonwoven porous structure has a comparatively large thickness. Further, because the fibers are intertwined with each other widthwise, the thickness of the sheet having a nonwoven porous structure is increased to 3.3 mm–5 mm.

The percentage of pores of the sheet having a nonwoven porous structure can be adjusted by controlling the feeding speed of the net conveyor 33. That is, with the increase in the feeding speed, the density of the fibers becomes coarse and thus, the percentage of pores becomes high, whereas with the decrease in the feeding speed, the density of the fibers becomes small and thus, the percentage of pores becomes low.

The sheet having a nonwoven porous structure composed of the fibers is heated at 800° C.–1200° for about two minutes to burn out the resin binder from the sheet having a nonwoven porous structure at step #6.

The sheet having a nonwoven porous structure is heated at 1000° C.–1300° for about 2–10 minutes to sinter metallic powder at step #7. In this manner, the porous metallic sheet 40 having a construction shown in FIG. 4 is produced to use it as the electrode substrate of a battery.

The percentage of pores of the porous metallic sheet 40 is set to 94%–98%. The area of one pore is set to 0.005 mm$^2$–0.942 mm$^2$. The thickness of the porous metallic sheet 40 is set to 0.5 mm–5 mm.

The porous metallic sheet 40 of the present invention to be manufactured by the method according to the first embodiment has advantages described below.

That is, as a result of the removal of the resin binder and sintering of metallic powder, the diameter of each metallic fiber becomes smaller by 5–40% because the resin binder and metal oxide are burnt out.

Figure 5A:
FIG. 5A is a sectional view showing a metallic fiber according to the present invention.
Figure 5B:
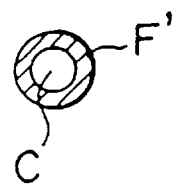
FIG. 5B is a sectional view showing a conventional metallic fiber.

That is, as shown in FIG. 5A, each of metallic fibers (F) obtained in the first embodiment is solid and the diameter thereof is small. As shown in FIG. 5B, supposing that organic fibers are extruded from the discharge port 51, the diameter of a resulting conventional metallic fiber F' is greater than that of the metallic fiber (F). This is because according to the conventional art, the organic fibers are metal-plated. Further, because the organic fibers are removed from the conventional metallic fiber F', a cavity (C) is generated therein. Thus, an active substance cannot be applied to the cavity (C).

More specifically, in the case of the metallic fibers (F) of the present invention shown in FIG. 5A, the diameter of each of the metallic fibers (F) is 20 $\mu$m in average, whereas in the case of the conventional metallic fiber F' shown in FIG. 5B, the diameter thereof is 30 $\mu$m in average. Thus, the volume of each of the metallic fibers (F) is smaller by 55.6% than that of the conventional metallic fiber F'.

Figure 6A:
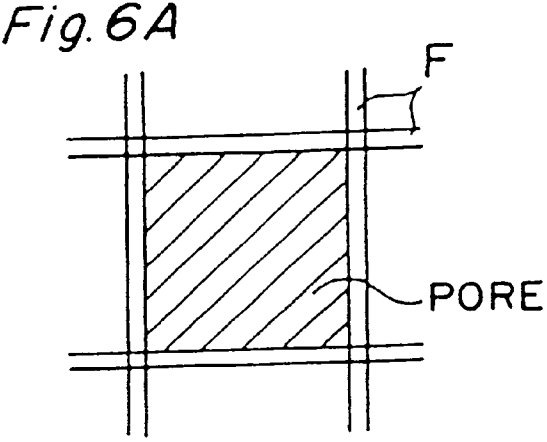
FIGS. 6A and 6C are plan views showing pores formed by metallic fibers in accordance with the present invention.
Figure 6B:
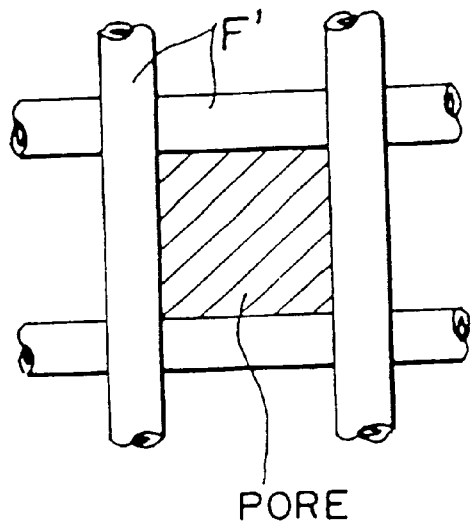
FIG. 6B is a plan view showing a pore formed by conventional metallic fibers.

Comparing the porous metallic sheet, in accordance with the present invention, formed of the metallic fibers (F) having a smaller diameter with the conventional porous metallic sheet formed by electrically plating organic fibers, a pore of the porous metallic sheet in accordance with the present invention shown by oblique lines of FIG. 6A has a greater area than that of the conventional porous metallic sheet shown by oblique lines of FIG. 6B.

Figure 6C:
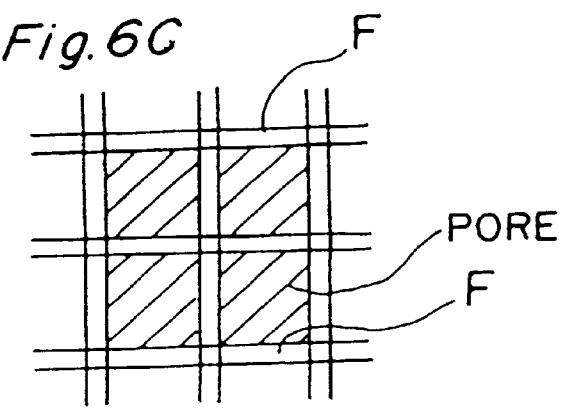

Let it be supposed that the fiber density of the present invention is equal to that of the conventional one. When the percentage of pores is 93% in the conventional porous metallic sheet, the percentage of pores is 96.9% in the porous metallic sheet of the present invention. When the percentage of pores is 96% in the conventional porous metallic sheet, it is 98.2% in the porous metallic sheet of the present invention. That is, the percentage of pores of the porous metallic sheet of the present invention is greater than that of the conventional porous metallic sheet. Thus, the entire area of pores of the present invention to which an active substance can be applied is equal to that of the conventional porous metallic sheet, the porous metallic sheet has the metallic fibers (F) 2.25 times as great as the conventional porous metallic sheet per area. That is, as shown in FIG. 6C, the metallic fibers (F) can be arranged at a higher density than the conventional metallic fibers F' per area. In this case, the gap between metallic fibers (F) which sandwich the active substance is smaller than that between the conventional metallic fibers F', and the area of contact between the active substance and the metal fibers (F) is greater than that between the conventional metallic fibers F'. Thus, the porous metallic sheet according to the present invention has a higher conductivity than the conventional one, thus allowing a battery to have a more favorable characteristic than the conventional one.

When the weight of metal to be used per area to form the porous metallic sheet of the present invention is equal to that to be used per area to form the conventional porous metallic sheet, the former is allowed to have more metallic fibers per area than the latter by 1.75 times as large as that of the latter, without decreasing the percentage of pores. Thus, the porous metallic sheet according to the present invention has a higher conductivity than the conventional one, thus allowing a battery to have a more favorable characteristic than the conventional one. Supposing that the same number of metallic fibers is used per centiare to form the porous metallic sheet of the present invention and the conventional one, 420 g is required per area in the case of the latter, whereas 240 g is required in the case of the former.

In this case, there is no problem on the strength of the porous metallic sheet of the present invention even though the weight of metal is smaller per area than that used in the conventional porous metallic sheet because the metallic fibers of the present invention are solid and continuous, and thus they have a higher strength than the conventional ones.

Figure 7A:
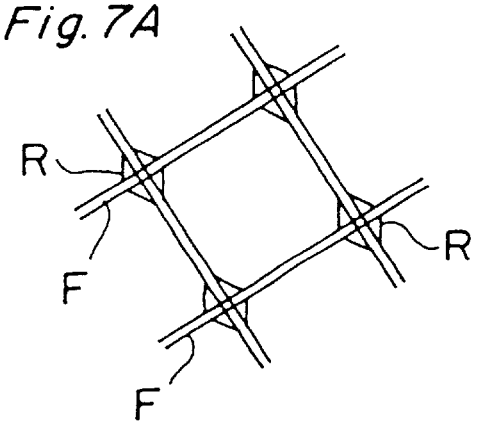
FIG. 7A is a plan view showing connection portions of metallic fibers in accordance with the present invention before resin is burnt out.
Figure 7B:
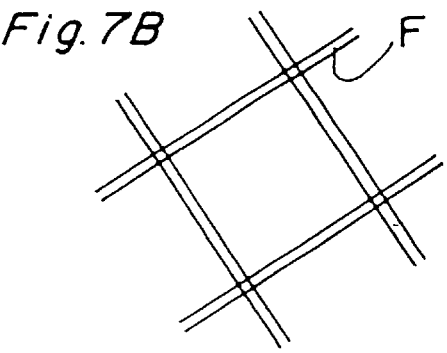
FIG. 7B is a plan view showing the connection portions of the metallic fibers in accordance with the present invention after the resin is burnt out.
Figure 28:
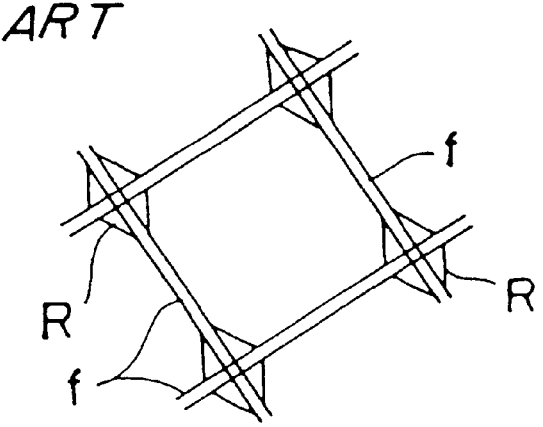
FIG. 28 is a plan view showing a conventional problem.

A conventional problem of a resin lump formed at connection points of the metallic fibers (F) as shown in FIG. 28 is described. Even though resin is collected at the connection point of the metallic fibers (F) shown in FIG. 7A, it is burnt out during a resin binder removal process and a sintering process. Consequently, as shown in FIG. 7B, the resin lump disappears from the connection point. Accordingly, the diameter of the metallic fibers (F) can be prevented from becoming partly larger and thus the percentage of pores can be prevented from being reduced.

Because the metallic fibers (F) are solid and continuous, they have a strength 1.5–3 times higher than the conventional metallic fibers formed by electrically plating organic fibers. Accordingly, in applying an active substance into pores, the porous metallic sheet 40 can be drawn at a great force. Thus, the active substance can be applied to the pores at a high speed.

Further, because the sheet having a nonwoven porous structure is formed by intertwining the solid metallic fibers with each other, the metallic fibers (F) is allowed to be present uniformly on the peripheral surface and the inner peripheral thereof, whereas in the case of the conventional metallic porous sheet formed by electrically plating organic fibers, a large amount of metal is deposited on the peripheral surface of the sheet and a small amount of metal is deposited in the inner of the sheet. Therefore, the porous metallic sheet of the present invention is capable of improving the performance of a battery.

Further, because the continuous metallic fibers (F) are bent in the coil spring configuration and intertwined with each other, the thickness of the porous metallic sheet can be set to as large as 3.3 mm–5 mm. Thus, the active substance can be applied to the porous metallic sheet 40 consisting of the metallic fibers (F) with high efficiency.

In the first embodiment, the discharge ports 51 for extruding the mixture (M) comprising the resin binder and metallic powder therefrom are arranged in parallel with each other in the nozzle body 20 of the spinning nozzle 16. When the mixture (M) contains a large amount of metallic powder and thus when it is not easy to extrude the mixture (M) from the discharge ports 51, it is preferable to use the nozzle body 20 shown in FIGS. 8B through 8D to form the mixture (M) into compound metallic fibers.

Figure 8B:
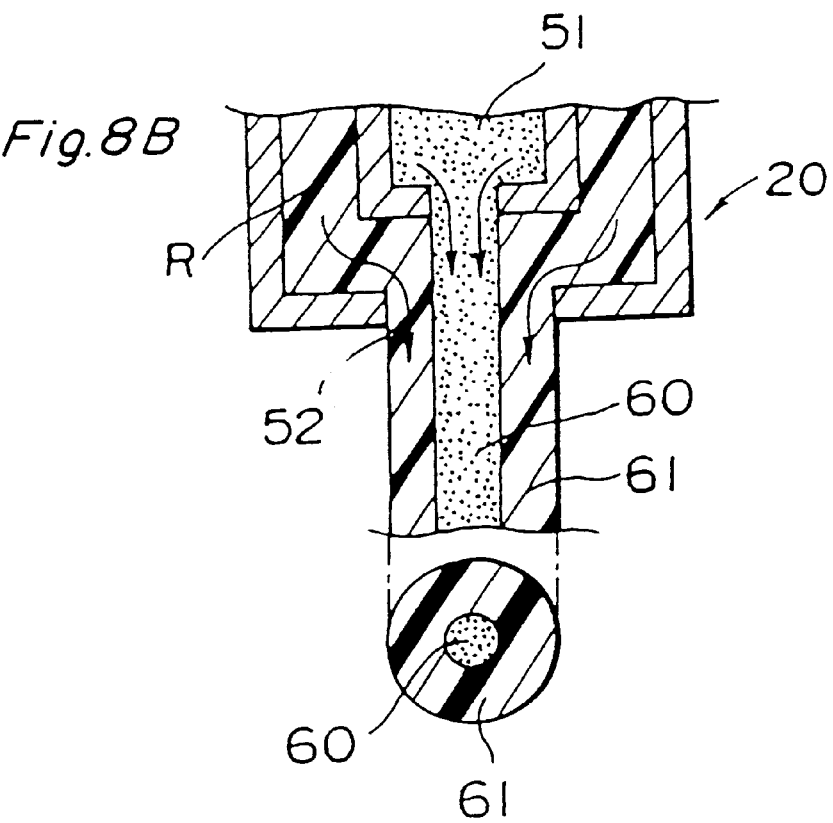

That is, the nozzle body 20 shown in FIG. 8B has the discharge port 51 for discharging the mixture (M) at the center thereof and a discharge port 52 for discharging only resin in the periphery of the discharge port 51. Thus, the mixture (M) extruded from the center of the nozzle body 20 forms a core 60 while the resin (R) extruded from the periphery of the center of the nozzle body 20 forms a sheath 61. That is, the mixture (M) is extruded from the nozzle body 20 as a compound metallic fiber consisting of the core 60 and the sheath 61 surrounding the core 60.

The sheath 61 of the compound metallic fiber thus formed serves as adhesive agent in forming the mixture (M) into the sheet having a nonwoven porous structure by vibrating the net conveyor 33 widthwise.

Because the sheath 61 is burnt out during a resin binder-removal and a sintering process, the diameter of the metallic fibers can be prevented from becoming great.

Figure 8D:
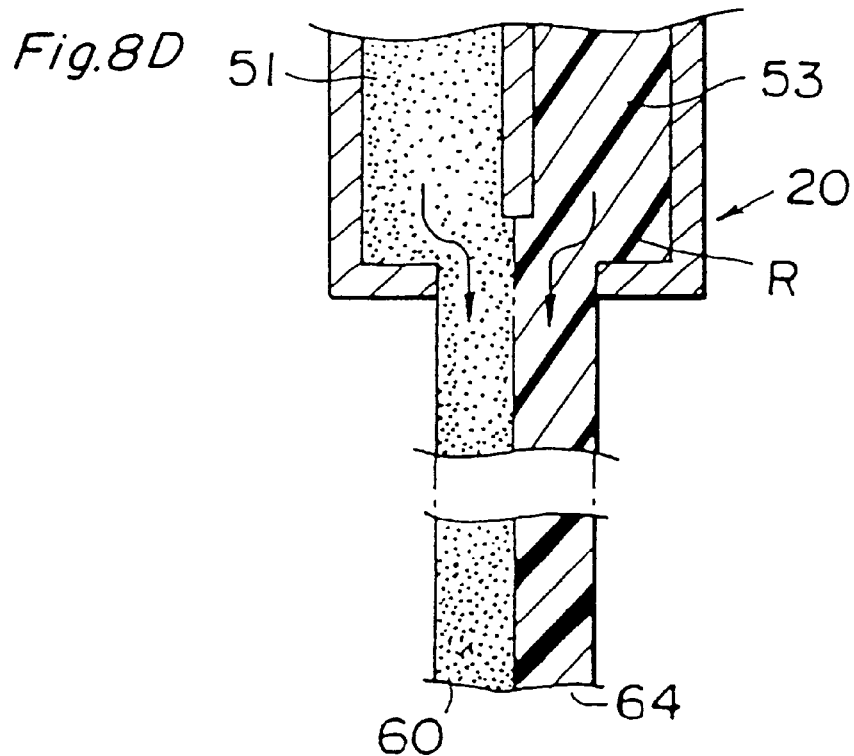
Figure 8C:
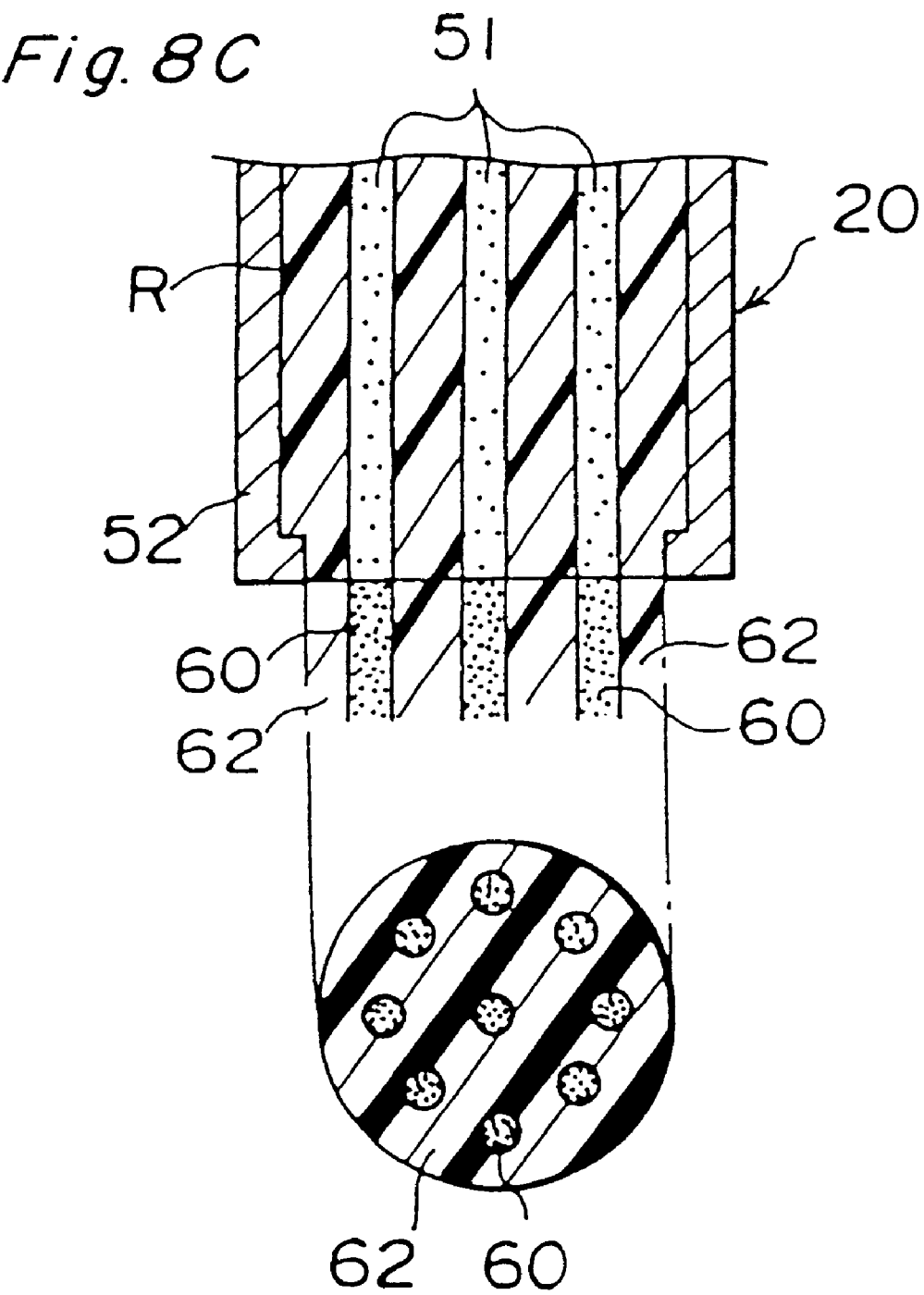

The nozzle body 20 shown in FIG. 8C has a large number of discharge ports 51, for discharging the mixture (M), at predetermined intervals inside the discharge port 52 having a large diameter. The mixture (M) extruded from the discharge ports 51 forms the cores 60, and the resin (R) is extruded between the cores 60. In this manner, the mixture (M) is extruded from the nozzle body 20 as a compound metallic fiber consisting of a resin portion 62 and a plurality of scattered cores 60 surrounded with the resin portion 62.

In the multi-core compound metallic fiber, the cores 60 are connected to each other during the resin binder-removal and sintering processes. As a result, each metallic fiber has a great surface area. When the resin portion 62 made of polyester is dissolved in an alkaline solution to remove polyester, the metallic fiber can be composed of small diameter-metallic fibers separated from each other.

The nozzle body 20 shown in FIG. 8D has the discharge port 51, for discharging the mixture (M), at one side of thereof and a resin discharge port 53 at the other side thereof. Resin different from the resin binder contained in the mixture (M) is discharged from the resin discharge port 53.

The mixture (M) is extruded from the discharge ports 51 and 53, with the mixture (M) being in contact with the resin different from the resin binder contained in the mixture (M) to form a compound metallic fiber consisting of the core 60 of the mixture (M) connected with a resin portion 64 in a bimetallic state.

The contraction coefficients of the core 60 and the resin portion 64 are different from each other. Therefore, when they are cooled in the cooling cylinder 21, the compound metallic fiber is curled. That is, the compound metallic fiber can be curved without using the crimpers 30 of suction drum type.

In the first embodiment, metallic powder and powdered resin binder are kneaded into filaments, and then, the filaments are cut to pellets, and then, the pellets are heated to fuse the powdered resin binder. Instead, it is possible to mix the metallic powder with the fused powdered resin binder, knead the mixture of the metallic powder and the fused resin binder, and extrude the mixture from the spinning nozzle.

Figure 9:
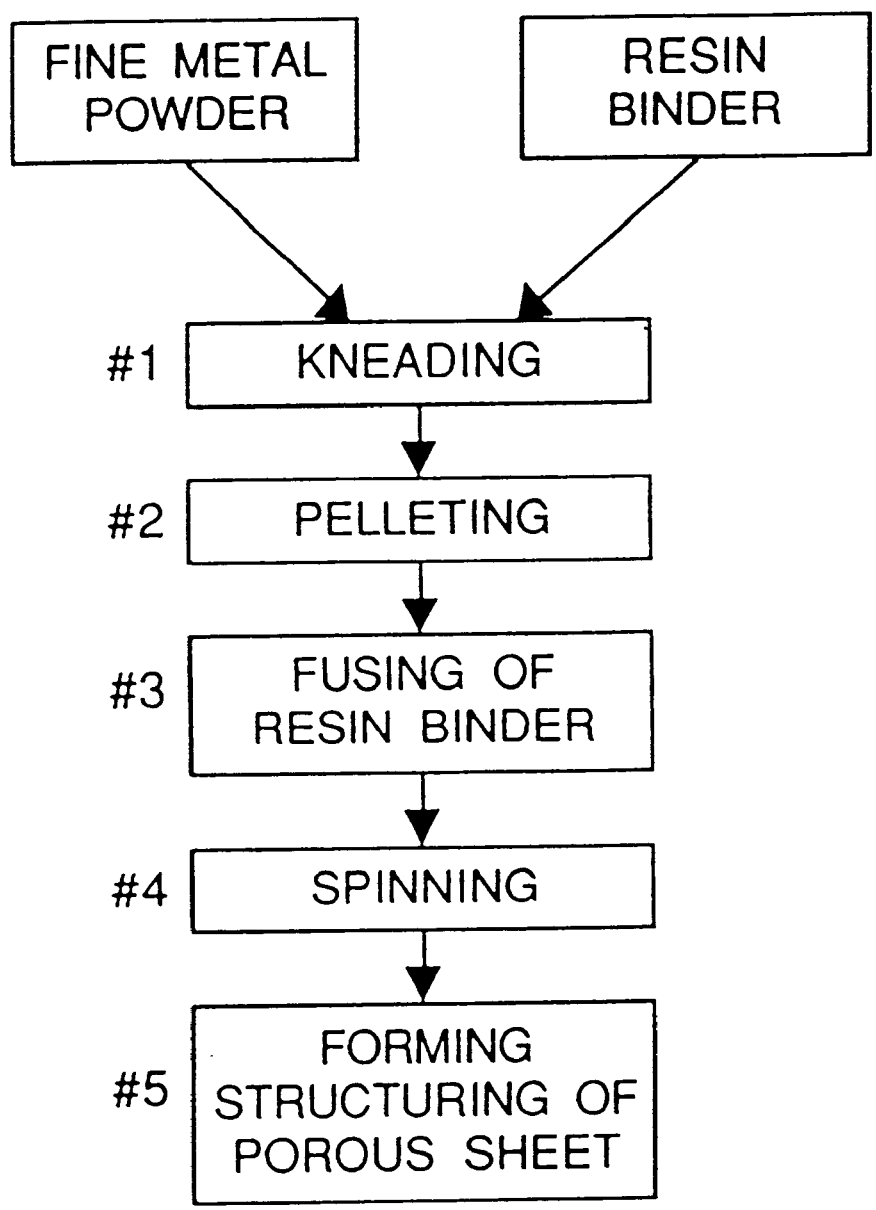
FIG. 9 is a flowchart showing another manufacturing method in accordance with the first embodiment.

In the first embodiment, after the sheet having a nonwoven porous structure is formed, it is burnt out to remove the resin binder and the metallic powder is sintered. But it is possible to omit the burning out process at step #6 and the sintering process at step #7 as necessary, as shown in FIG. 9. If the metallic powder is mixed at high percentages, for example, 95%–97% with the resin binder, it is unnecessary to burn out the sheet having a nonwoven porous structure to remove the resin binder.

Figure 10:
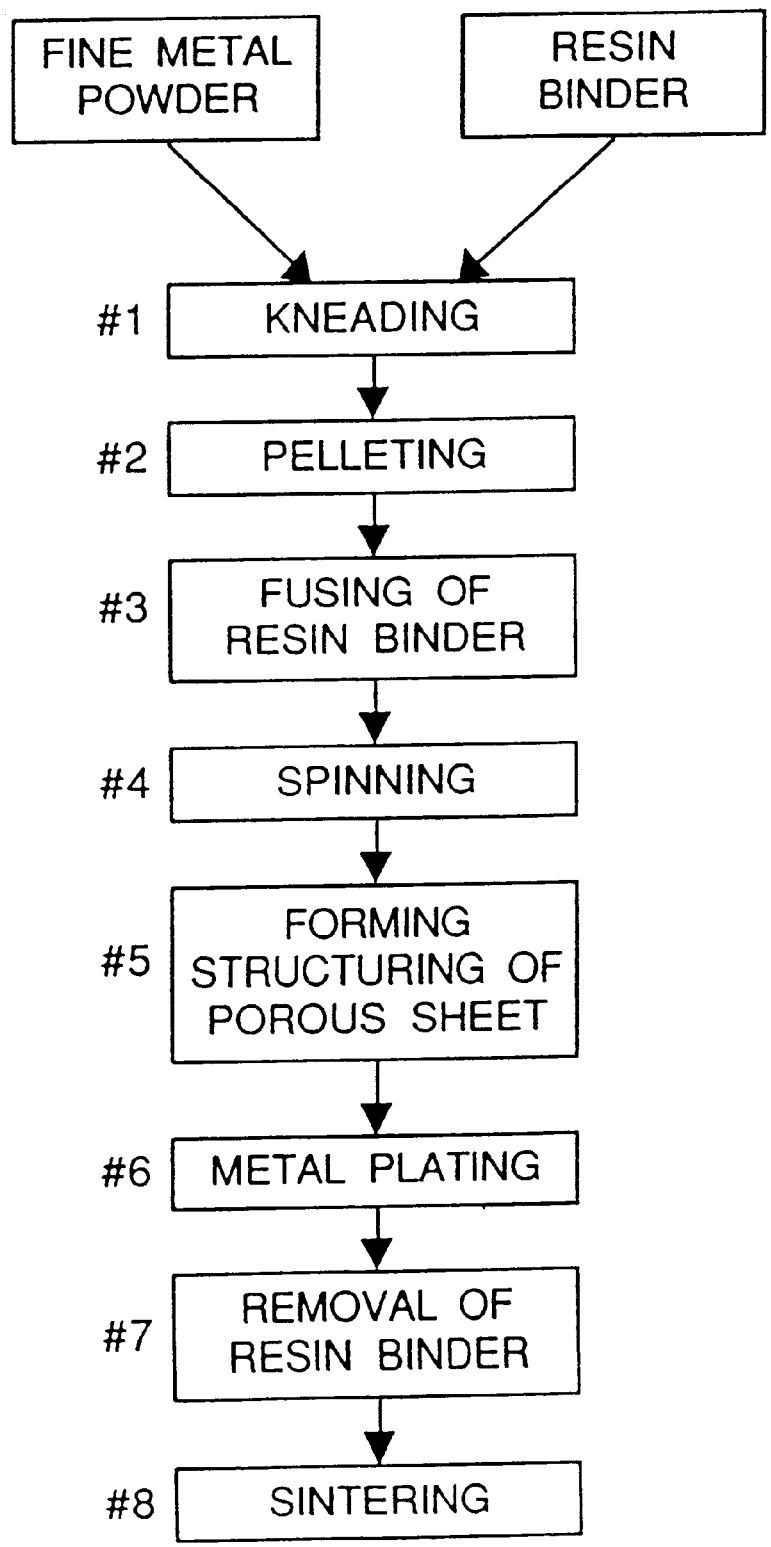
FIG. 10 is a flowchart showing still another manufacturing method in accordance with the first embodiment.

Further, as shown in FIG. 10, after the sheet having a nonwoven porous structure is formed at step #5 of the first embodiment, the sheet having a nonwoven porous structure may be electrically plated at step #6 and then, the resin binder may be burnt out at step #7, and then, metallic powder may be sintered at step #8.

That is, if it is necessary to increase the weight of metal per area in forming the porous metallic sheet so as to allow metallic fibers to have a great strength, the sheet having a nonwoven porous structure may be plated. In this case, because metallic fibers of the sheet having a nonwoven porous structure are solid, a much smaller amount of metal is used to plate it compared with the conventional electrical plating method. Thus, a much smaller of electric power is consumed in plating the sheet having a nonwoven porous structure.

Figure 11:
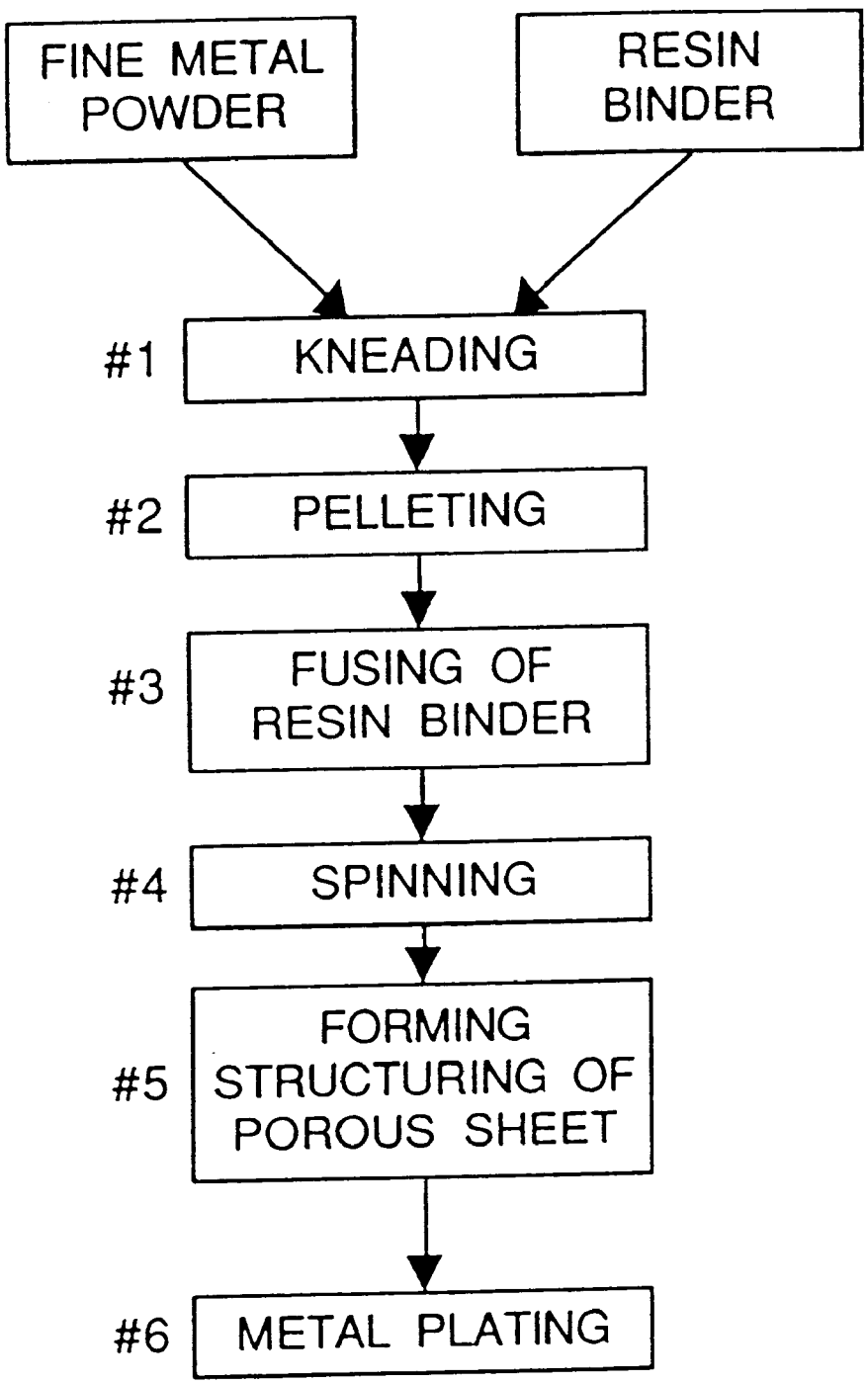
FIG. 11 is a flowchart showing a further manufacturing method in accordance with the first embodiment.

It is possible to omit the burning out process and the sintering process as necessary, as shown in FIG. 11.

The kind of metallic powder to be mixed with the powdered resin binder is not limited to one, but a plurality of kinds of metallic powders may be mixed with the resin binder so as to form compound metallic fibers.

Figure 12A:
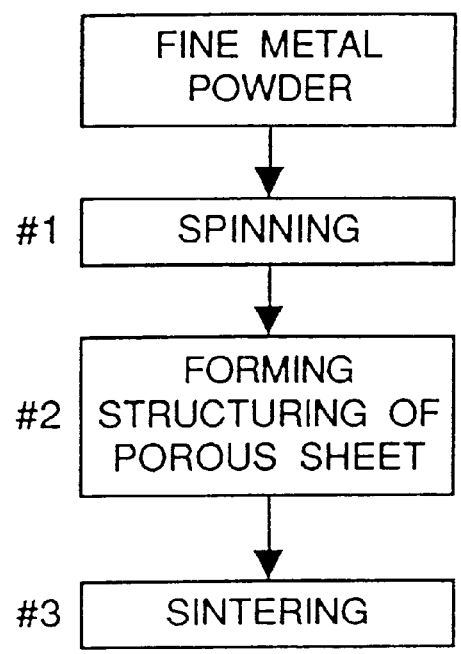
FIGS. 12A and 12B are flowcharts each showing a manufacturing method in accordance with a second embodiment of the present invention.

In the first embodiment, fine metallic powder and the powdered resin binder are kneaded, while in the second embodiment, fibers are formed of only metallic powder. That is, as shown in FIG. 12A, at step #1, fine metallic powder is supplied under a high pressure to the spinning nozzle 16 shown in FIG. 2. Pressurizing force to be applied to the fine metallic powder is set at about 30–70 times, preferably about 50 times as great as that to be applied to the mixture of the fine metallic powder and the resin binder in the first embodiment. By applying such a great pressure to the fine metallic powder in supplying the fine metallic powder to the spinning nozzle 16, the metallic fibers (F) are continuously extruded in a greater number from the nozzle body 20 at step #1.

After the metallic fibers (F) are formed at step #1, similarly to the first embodiment, the metallic fibers (F) are drawn and cooled in the cooling cylinder 21 provided below the spinning nozzle 16; continuously bent into a coil spring configuration by the crimpers 30 positioned below the cooling cylinder 21; and then, supplied to the net conveyor 33 so as to form a metallic sheet having a nonwoven porous structure at step #2.

The metallic sheet having a nonwoven porous structure is sintered at 1,000° C.–1,300° C. for about 2–10 minutes in an atmosphere of reducing gas so as to produce a porous metallic sheet to be used as a substrate of a battery electrode. It is possible to omit the sintering process as necessary.

Figure 12B:
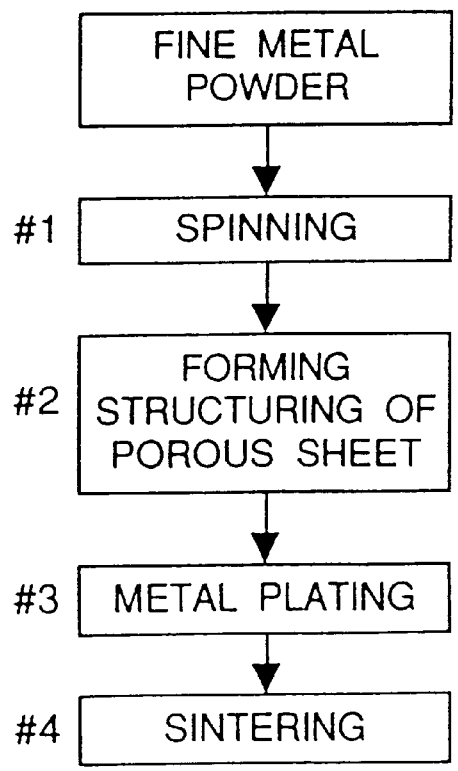

As shown in FIG. 12B, it is possible to plate the metallic sheet having a nonwoven porous structure electrically at step #3 after it is formed at step #2 and then, sinter the plated metallic sheet having a nonwoven porous structure at step #4.

In the first and second embodiments, in order to form the sheet having a nonwoven porous structure, the method of bending the continuous metallic fibers formed by using the spinning nozzle and then transporting them to the net conveyor. But other methods can be adopted when a porous fiber sheet or a three-dimensional net-shaped sheet having a porous structure is formed of metallic fibers.

For example, the continuous metallic fibers (F) may be woven in a mesh configuration to form a mesh sheet as shown in FIG. 13.

It is also possible to cut continuous metallic fibers extruded from the spinning nozzle and put them into water so as to form short metallic fibers of 2 mm–60 mm and then use dry nonwoven sheet-producing method to form the sheet having a nonwoven porous structure. That is, after drying the short metallic fibers, they are raveled or accumulated at random by applying air thereto so as to form the sheet having a nonwoven porous structure.

It is also possible to use wet nonwoven sheet-producing method of dispersing the short metallic fibers in water or water containing adhesive agent and collecting them with a net so as to form the sheet having a nonwoven porous structure.

It is also possible to use melt-blow nonwoven sheet-producing method of applying heated gas to the metallic fibers so as to draw and cut them to short fibers and then directly accumulating the short fibers on the conveyor so as to form the sheet having a nonwoven porous structure.

It is also possible to use span bonding method of applying air to the metallic fibers so as to draw them, accumulating them on the conveyor directly to form a web consisting of continuous metallic fibers, and bonding fibers of the web to each other with adhesive agent.

Figure 14A:
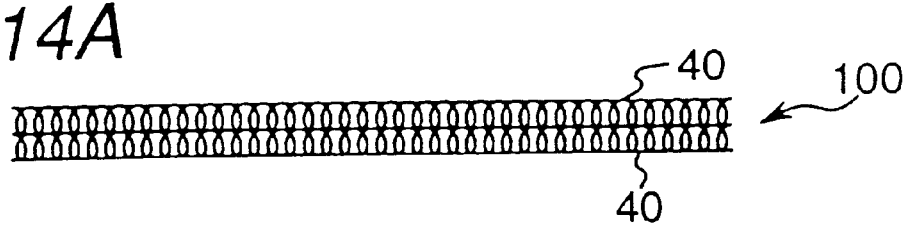
FIGS. 14A, 14B, and 14C are schematic sectional views each showing a porous metallic sheet in accordance with a third embodiment of the present invention.
Figure 14B:
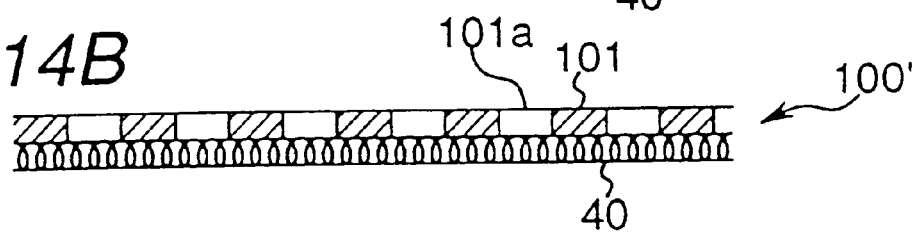
Figure 14C:
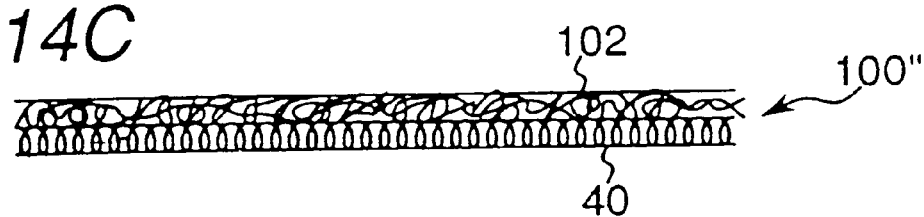

In the third embodiment, a plurality of porous metallic sheet 40 made of metallic powder is laminated one on the other to form a porous metallic sheet 100 to be used as a substrate of a battery electrode as shown in FIG. 14A. The porous metallic sheet 40 has a porous fibrous structure having a nonwoven sheet, a woven sheet, knitted sheet, a felt sheet, a screen-shaped sheet, an expanded sheet, a net-shaped sheet; and a three-dimensional net-shaped structure having a foamed sheet, a spongelike sheet, a honeycomb-shaped sheet. In addition, as shown in FIG. 14B, it is possible to overlay a conductive metallic foil 101 having a plurality of pores 101a formed thereon on the porous metallic sheet 40 to form a porous metallic sheet 100'. Further, as shown in FIG. 14C, it is possible to form a porous metallic sheet 100" by laminating the porous metallic sheet 40 and a porous metallic sheet 102 formed by plating foamed, mesh or nonwoven sheets made of resin and then burning out resin binder and sintering metallic powder.

Figure 15:
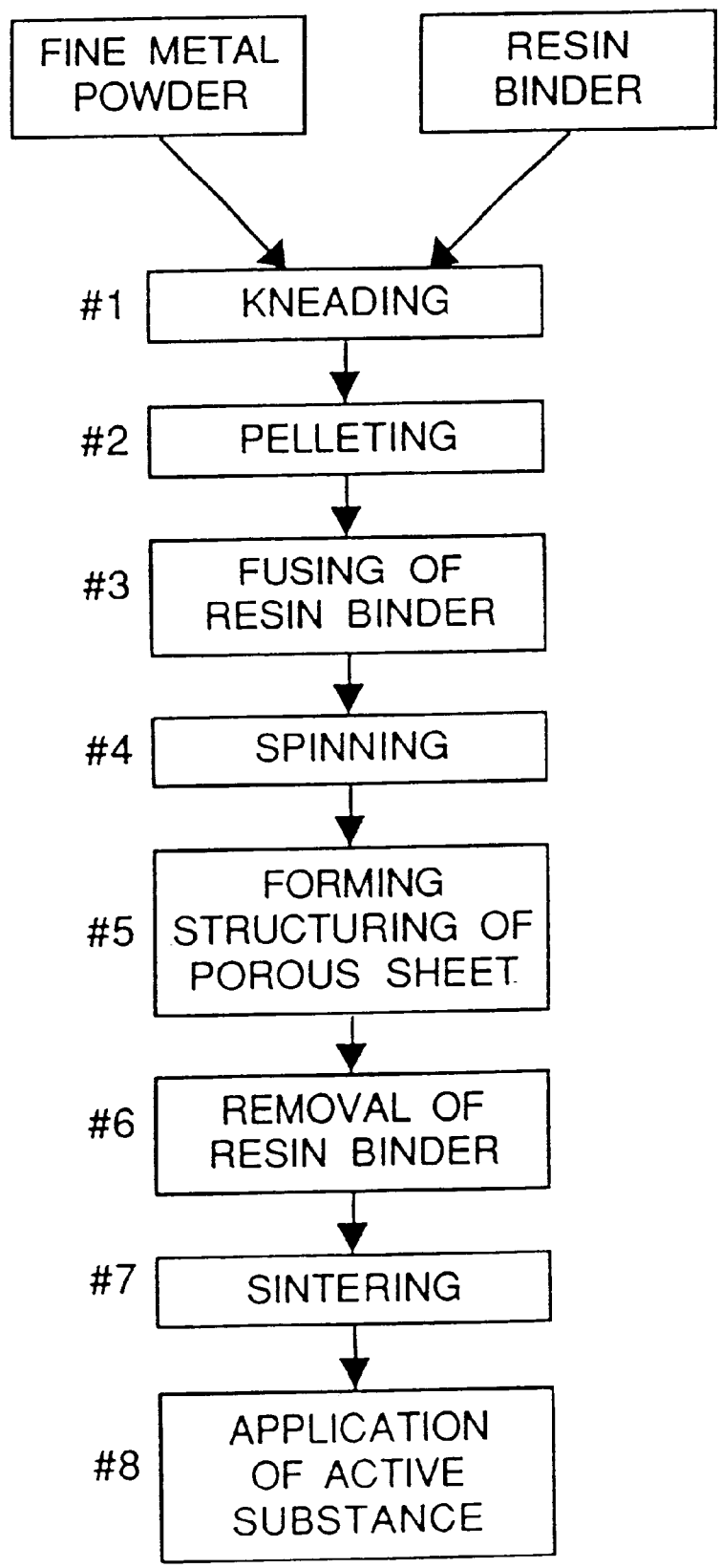
FIG. 15 is a flowchart showing a manufacturing method in accordance with a fourth embodiment.

In a fourth embodiment, as shown in FIG. 15, an active substance is applied to the porous metallic sheets 40 of the first and second embodiment, 100, 100' or 100" of the third embodiment so as to form an electrode plate of a battery. As shown in FIG. 15, at step #8, the active substance is applied to the porous metallic sheet formed in the process of steps #1 through #7 of FIG. 1 showing the first embodiment. Needless to say, the active substance may be applied to the porous metallic sheet after performing the operation of the final process shown in FIGS. 9, 10, and 11 showing the modifications of the first embodiment, after performing the operation of the final process shown in FIGS. 12A and 12B showing the second embodiment or after forming the porous metallic sheet by overlaying the porous metallic sheets 100, 100' or 100" on the porous metallic sheet 40.

The active substance is applied to the nonwoven porous metallic sheet consisting of nickel fibers composed of nickel powder while the porous metallic sheet is being continuously drawn, so that an electrode of a nickel hydrogen battery is formed. Three experiments of the fourth embodiment are described below.

In a first experiment, paste of an active substance was applied to a nonwoven porous metallic sheet made of nickel. The paste was obtained by kneading a mixture of 100 parts by weight of nickel hydroxide powder, 10 parts by weight of cobalt powder, 0.2 parts by weight of methyl cellulose used as adhesive agent, and 20 parts by weight of water. After the paste is dried, it is molded under pressure to form a positive electrode plate of a nickel hydrogen battery having a thickness of 0.5 mm.

In a second experiment, paste of an active substance was applied to a sheet having a three-dimensional net-shaped structure made of nickel. The paste was obtained by kneading a mixture of 90 parts by weight of nickel hydroxide, 10 parts by weight of cobalt oxide, 0.4 parts by weight-of carboxyl methyl cellulose, and 43 parts by weight of water. After the paste is dried, it is rolled by a roller press to form a positive electrode plate of a nickel cadmium battery having a thickness of 0.6 mm.

In a third experiment, paste of an active substance was applied to the three-dimensional net-shaped sheet made of nickel. The paste was obtained by kneading a mixture of 90 parts by weight of cadmium oxide, 10 parts by weight of nickel powder, 2.8 parts by weight of polyethylene powder, and 2.5 parts by weight of polytetrafluoroethylene, and organic solvent. After the paste is dried, it is molded under pressure form a negative electrode plate of a nickel cadmium battery having a thickness of 0.45 mm.

In the porous metallic sheet to be used as a substrate of a battery electrode according to the first invention, the diameter of metallic powder is as small as $0.1 \mu m–5 \mu m$. Thus, the metallic powder mixed with fused resin binder can be extruded from the spinning nozzle to form the mixture into fibers. Further, because the diameters of the fibers thus formed are as small as $1.0 \mu m$ $100 \mu m$, the porous metallic sheet formed of the fibers has an improved percentage of pores and further, the area of one pore of the porous metallic sheet of the present invention is smaller area than that of one pore of the conventional porous metallic sheet, supposing that the percentage of pores of the former is the same as that of the latter. Thus, the former has a higher conductivity than the latter.

Further, because the metallic fibers are continuous or long, the porous metallic sheet made of the fibers is allowed to have a high tension and thus the active substance can be applied to the porous metallic sheet at a high speed.

It is possible to use various kinds of metals to form the porous metallic sheet in order to allow it to have a feature of each of the metals used. Further, a mixture of various kinds of metallic powders may be used to form fibers to allow the porous metallic sheet to have various characteristics which cannot be provided by the porous metallic sheet consisting of fibers made of only one kind of metal.

A method for manufacturing a porous metallic sheet to be used as a substrate of a battery electrode in accordance with a second invention is described below. The porous metallic sheet is characterized in that metallic fibers are intertwined with each other to form a sheet; the sheet is heated under pressure; and the intersections of the metallic fibers are connected directly with each other by fusing the surfaces of the intersections.

Figure 16:
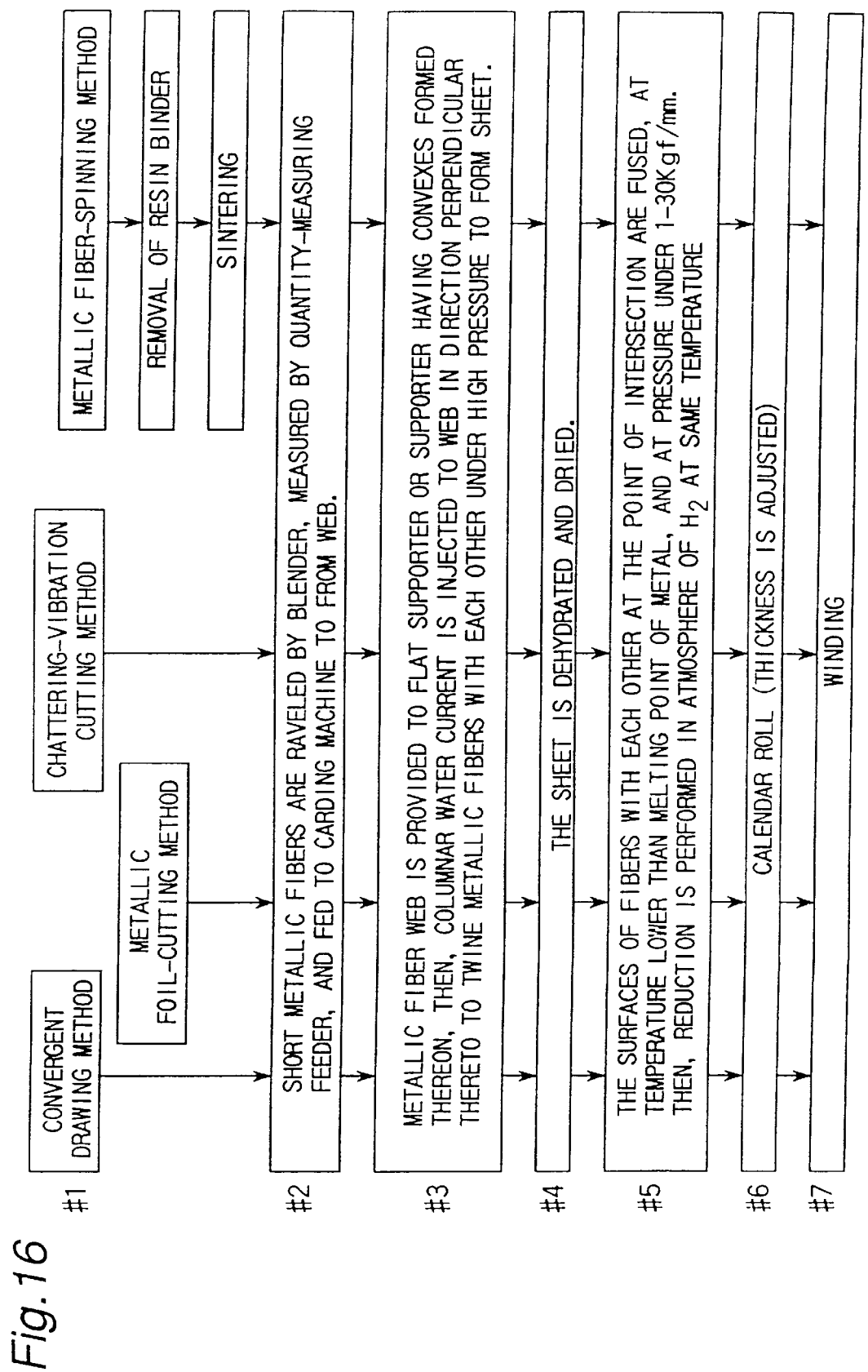
FIG. 16 is a flowchart showing a manufacturing method in accordance with a fifth embodiment.

The porous metallic sheet of the second invention is produced by the fifth embodiment shown in FIG. 16 showing the process of producing a porous metallic sheet from four kinds of short metallic fibers.

As shown in FIG. 16, in a first process, short metallic fibers are formed by any one of the following four kinds of methods:

(1) Short metallic fibers are formed by cutting fine metallic fibers formed by convergent drawing method.
(2) Short metallic fibers are formed by cutting fine metallic fibers formed by metallic foil cutting method.
(3) Short metallic fibers are formed by cutting metallic bars or metallic foil coils by chattering-vibration method.
(4) Short metallic fibers are formed by cutting metallic fibers obtained by the metallic fiber-spinning method of the first invention.

Figure 17:
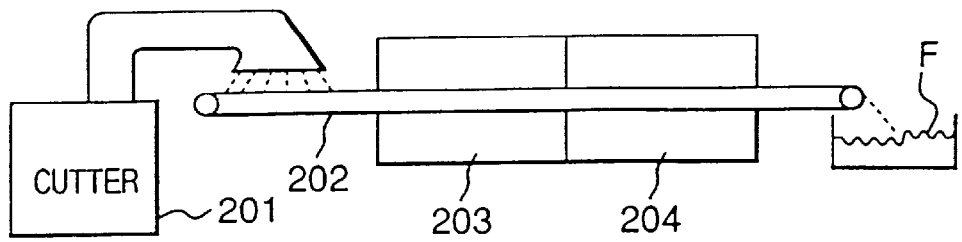
FIG. 17 is a schematic view showing a step of a manufacturing process in accordance with the fifth embodiment.

The diameter of the metallic fibers formed by the method (4) can be set arbitrarily in the range of $1 \mu m–100 \mu m$. It is unnecessary in the case of the metallic fibers formed by extruding only metallic powder from the spinning nozzle, whereas in the case of the metallic fibers formed by spinning a mixture of the metallic powder and the resin binder, the mixture is extruded from the spinning nozzle to obtain continuous fibers. Thus, in the latter case, it is necessary to burn out resin binder. To this end, as shown in FIG. 17, continuous fibers are cut to a required length of 1 mm–60 mm by a cutter 201, and then, the cut fibers are supplied to a conveyor 202 and then fed to a burning out oven 203 in which the fibers are heated in a nonoxidizing atmosphere at a binder-decomposing temperature lower than the melting point of the metal (850° C.–900° C.) used, so as to burn out the resin binder, then heated at 1200° C. in a sintering oven 204 having reducing atmosphere of hydrogen to sinter the metallic powder. In this manner, short metallic fibers (F) to which the resin binder has not been mixed.

As the fine metallic fibers formed by the convergent drawing method (1), a bundle of a plurality of stainless steel filaments is cold-drawn to reduce the diameter of each filament to less than $20 \mu m$. The resulting filaments are cut similarly to the metallic fibers formed of the metallic powder.

As the fine metallic fibers formed by the metallic foil cutting method (2), 10 aluminum foils of $10 \mu m$ in thickness are laminated on each other and cut at an interval of $10 \mu m$, and resultant fine metallic fibers are cut, similarly to the metallic fibers formed of the metallic powder.

In the chattering-vibration method (3), a metallic bar or a metallic foil coil is cut to a plurality of fibers by the self-excited vibration of an elastic cutting tool while the metallic bar or the metallic foil is rotating. This method allows the diameter of each fiber to be adjusted to $4 \mu m–100 \mu m$ and the length thereof to 1 mm–5 mm.

Substances Ni, Cu, Al, Ag, Fe, Zn, Sn, In, Ti, Pb, V, Cr, Co, oxides of these metals, alloys of these metals, and mixtures of these metals are favorably used to form the metallic fibers by using the methods (1) through (4). Stainless steel and titanium are more favorably used because these substances are corrosion-resistant. As the stainless steel, SUS 304, SUS316 containing molybdenum, and SUS 444 containing niobium and molybdenum are preferably used.

The short metallic fibers formed any one of the four methods are raveled by a blender in the second process and then measured by a quantity-measuring feeder, and then, supplied to a carding machine to form a web (B). The web (B) consists of fibers which are raveled and accumulated at random as like as cotton wool.

Figure 18:
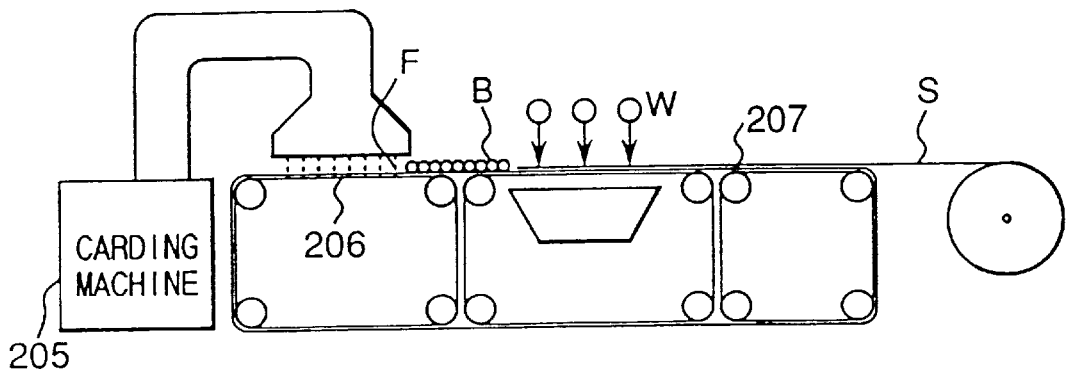
FIG. 18 is a schematic view showing a step of the manufacturing process in accordance with the fifth embodiment.

In the third process, as shown in FIG. 18, the web (B) consisting of metallic fibers is transferred from the carding machine 205 to a supporter 207 positioned on the conveyor 206 on which fluid, for example, columnar water current 200 is injected under a high pressure to the web (B) in a direction perpendicular thereto so as to three-dimensionally intertwine the metallic fibers of the web (B) with each other to form a sheet (S).

Figures 19A, 19B:
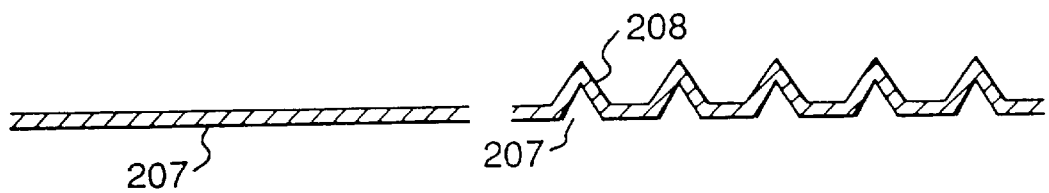
FIGS. 19A and 19B are schematic views showing supporters to be used in the manufacturing process in accordance with the fifth embodiment.

The upper surface of the supporter 207 comprising a screen or a fine mesh sheet is flat and drops water current. As shown in FIGS. 19A and 19B, there are two types in the supporter 207. The supporter 207 shown in FIG. 19B has conic or pyramidal convexes 208 formed on the upper surface thereof at regular intervals lengthwise and widthwise. As will be described later, the convexes 208 serves to form through-pores in a sheet of metallic fibers intertwined with each other. When it is unnecessary to form the through-pores in the sheet, the supporter 207 having no convexes formed thereon shown in FIG. 19A is used.

Figure 20:
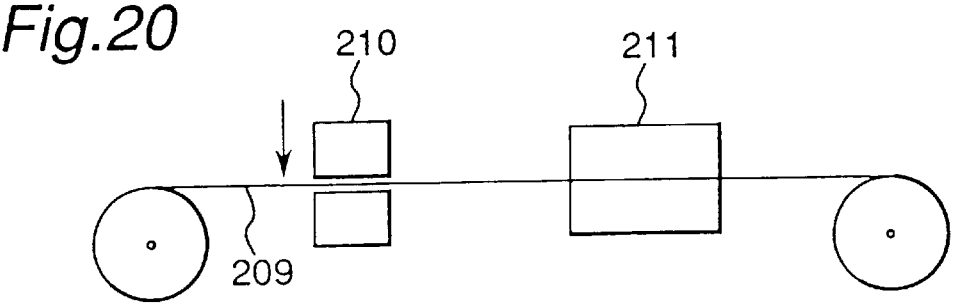
FIG. 20 is a schematic view showing a step of the manufacturing process in accordance with the fifth embodiment.

Because the sheet (S) is formed by using the highly pressurized columnar water current 200 in the third process, the sheet (S) is dehydrated and dried in the fourth process. That is, as shown in FIG. 20, the sheet (S) take out from the supporter 207 is supplied to a conveyor 209, and then, pressed between a pair of dehydration presses 210, and is then passed through a drying oven 211 to heat it at a predetermined temperature to dry it.

Figure 21:
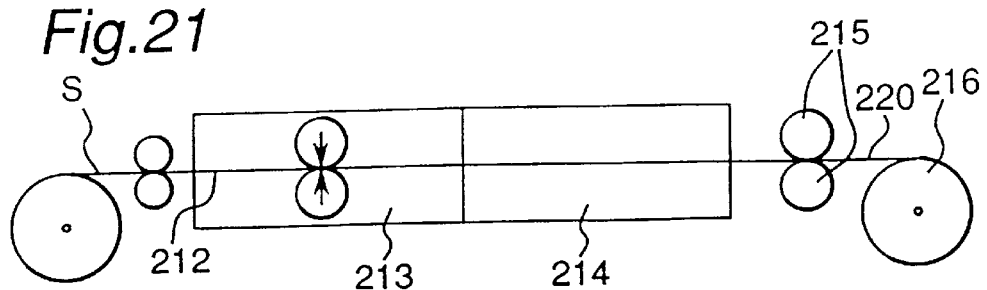
FIG. 21 is a schematic view showing a step of the manufacturing process in accordance with the fifth embodiment.

In the fifth process, as shown in FIG. 21, the dried sheet (S) is supplied to a conveyor 212, and then, passed through a pressurizing/heating oven 213 to heat it in a nonoxidizing atmosphere, at a pressure less than 1–30 kgf/mm, at a temperature lower than the melting point of the metal used, so as to directly connect directly the surfaces of intersections of intertwined short metallic fibers. Then, the sheet (S) is supplied to a reducing oven 214 at which reduction is performed in reducing atmosphere at a temperature lower than the melting point of the metal used.

In the sixth process, the resultant porous metallic sheet is passed between a pair of calendar rolls 215 to adjust the thickness thereof to a predetermined one. In the seventh process, a resultant porous metallic sheet 220 having the predetermined thickness is coiled around a roll 216.

The operations of the first through seventh processes may be performed by using a feeding apparatus having a construction for performing the operations successively.

In the third process, the metallic fibers of the web (B) is three-dimensionally intertwined with each other by means of the columnar water current 200 injected thereto at a high pressure. In this case, when the supporter 207 is not provided with the convexes 208 on the upper surface thereof as shown in FIG. 19A, the water current 200 presses the entire web (B) against the upper surface of the supporter 207 at the same pressure, thus forming the sheet (S) on the upper surface of the supporter 207. The sheet (S) is taken out from the supporter 207 as a three-dimensional nonwoven porous metallic sheet having pores formed therein. In this case, the percentage of pores of the porous metallic sheet can be adjusted to a desired percentage according to the density of the metallic fibers constituting the web (B). That is, if the metallic fibers are arranged at a high density, the porous metallic sheet has a low percentage of pores, i.e. has a state close to a solid metal, whereas if they are arranged at a low density, the porous metallic sheet has a high percentage of pores.

Figure 22:
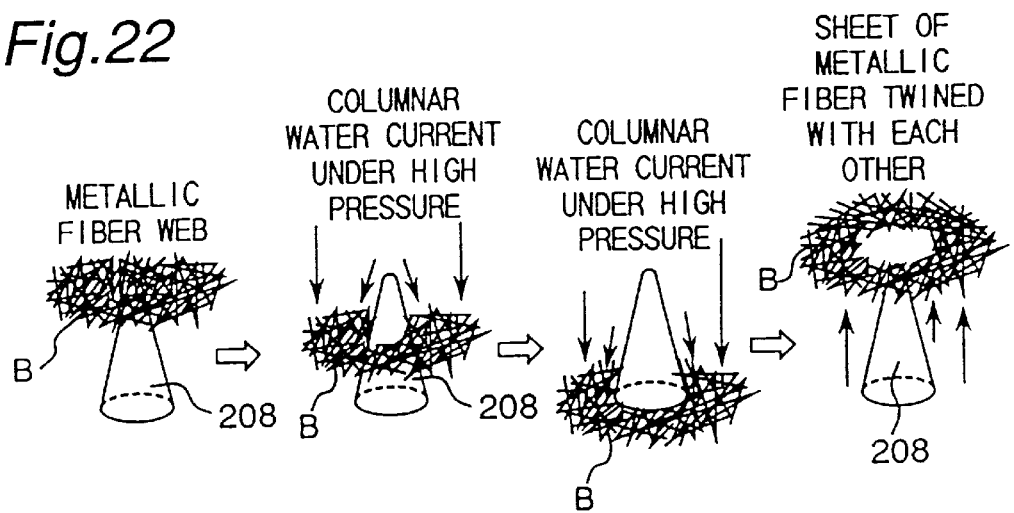
FIG. 22 is a view showing an action of intertwining metallic fibers of a web with each other and forming a through-hole in the manufacturing process in accordance with the fifth embodiment.
Figure 23A:
FIGS. 23A, 23B, and 23C are views showing the relationship between the configuration of a convex of a supporter and a formed through-hole in accordance with the first embodiment.
Figure 23B:
Figure 23C:

The convex 208 formed on the supporter 207 shown in FIG. 19B is conic as shown in FIG. 22 or pyramidal as shown in FIGS. 23B and 23C.

When the columnar water current 200 is injected under a high pressure to the web (B) placed on the upper surface of the convex 208 formed on the supporter 207, the web (B) on the convex 208 flows downward from the upper end of the convex 208 and forced to drop to the upper surface of the supporter 207 in the periphery of the convex 208 along the peripheral surface of the convex 208, as shown in FIG. 22, thus forming the annular web (B) in the periphery of the lower end of the convex 208. Thus, through-holes 218 corresponding to the sectional configuration of the lower end of the convex 208 is formed on the sheet (S).

When the convexes 208 are conic and formed at regular intervals, as shown in FIG. 23A, the circular through-holes 218 are formed at regular intervals on the sheet (S) When the convexes 208 are pyramidal as shown in FIGS. 23B and 23C, the rhombic or square through-hole 218 are formed on the porous metallic sheet 220. Thus, the lath-shaped through-holes 218 or the net-shaped through-holes 218 are formed on the porous metallic sheet 220. The three-dimensional nonwoven porous metallic sheet 220 having the circular through-holes 218, the lath-shaped through-holes 218 or the net-shaped through-holes 218 has not only the through-holes 218 formed therein at regular intervals, but also a great number of fine pores at the portion except for the through-holes 218.

Figure 24:
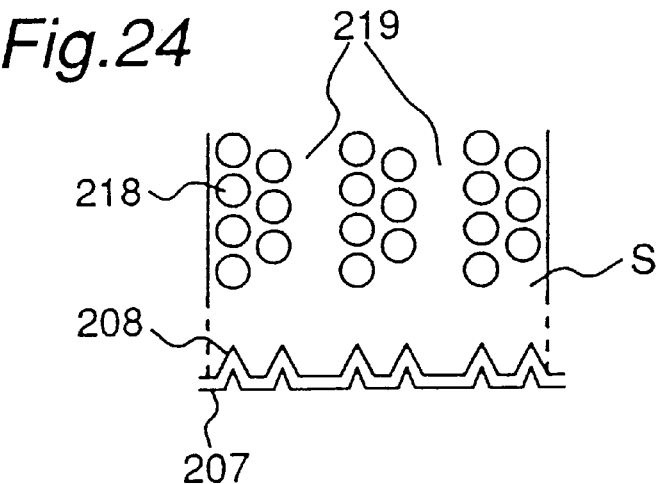
FIG. 24 is a plan view showing a porous metallic sheet on which a portion serving as a lead is formed in accordance with the fifth embodiment.

As shown in FIG. 24, when the convexes 208 are formed on the porous metallic sheet 200 at regular intervals in a belt configuration, blank portions 219 are formed at regular intervals between rows of the through-holes 218. The blank portions 219 are used as a lead of an electrode plate of a battery. That is, in order to allow the blank portions 219 to be used as the lead, only the blank portions 219 are pressed by a roller to decrease pores so as to increase the density of the metallic fibers, namely, to allow the porous metallic sheet 220 to have a state close to a solid metal. It is possible to attach a metallic foil to the porous metallic sheet 220. The active substance is applied to the porous metallic sheet 220 made of metallic fibers produced in the above process while it is being successively transported. At this time, the active substance is applied not only to the through-holes 218 of the porous metallic sheet 220 having the circular through-holes 218, the lath-shaped through-holes 218 or the net-shaped through-holes 218, but also to fine pores thereof. The active substance is also applied to the porous metallic sheet 220 even though the through-holes 218 are not formed therein because it has fine pores at 90%–99%. The active substance is also applied to both surface of the porous metallic sheet 220 in a required thickness. The porous metallic sheet 220 having the active substance applied thereto is cut to a plurality of pieces having a required size so as to use the cut pieces as a positive or negative plate of a battery.

Figure 26:
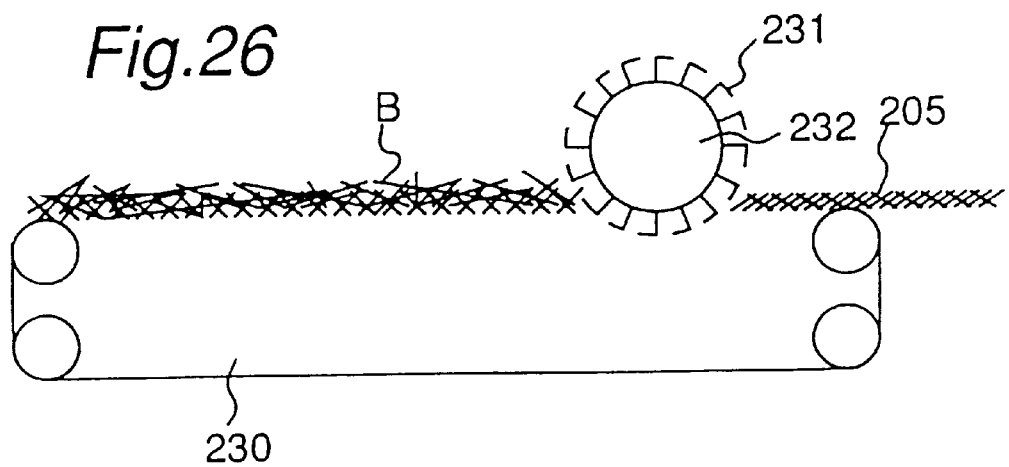
FIG. 26 is a schematic view showing a portion of a manufacturing process in accordance with a sixth embodiment.
Figure 25:
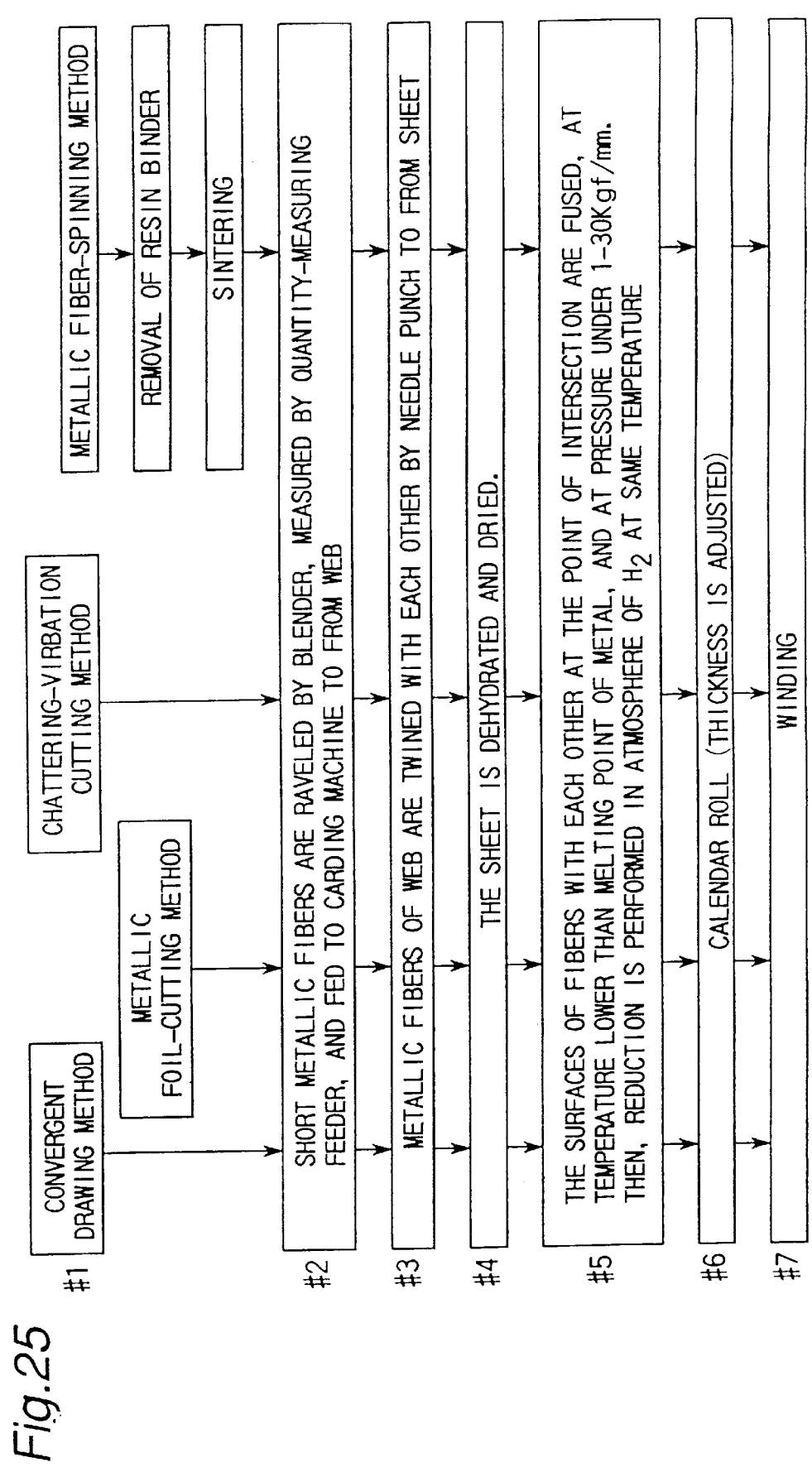
FIG. 25 is a flowchart showing a manufacturing method in accordance with a sixth embodiment.

FIG. 25 is a flowchart showing a manufacturing method according to the sixth embodiment. Except the third process, the manufacturing method is the same as that of the fifth embodiment. In the third process, the web (B) is placed on a conveyor 230 as shown in FIG. 26. The conveyor 230 is provided with a roll 232 from which needles 231 having a small diameter project. The needles 231 penetrate into the web (B) so as to intertwine metallic fibers of the web (B) with each other three-dimensionally. In this manner, the sheet (S), namely, a porous metallic sheet is formed.

Figure 27A:
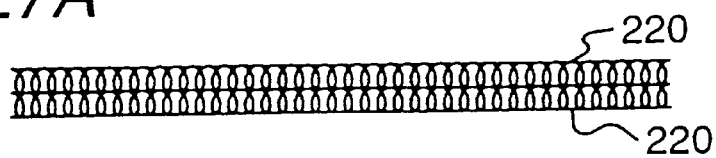
FIGS. 27A, 27B, and 27C are schematic sectional views each showing a substrate in accordance with a seventh embodiment.
Figure 27B:
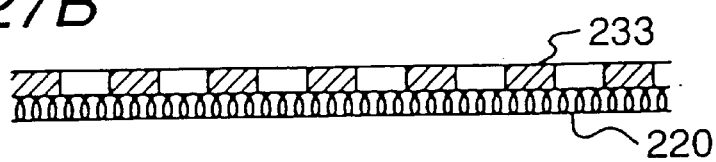
Figure 27C:
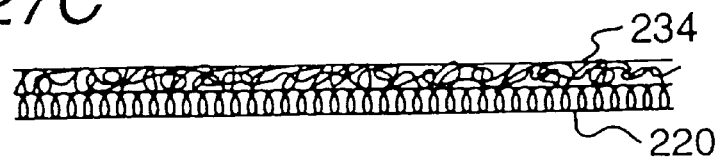

FIGS. 27A, 27B, and 27C show an electrode substrate of a battery according to the seventh embodiment. FIG. 27A shows an electrode substrate comprising a plurality of laminated three-dimensional porous metallic sheets 220, having pores, made of the metallic fibers produced by the manufacturing method according to the fifth embodiment. The surfaces of the porous metallic sheets 220 are fused at a temperature lower than the melting point of metal used, so as to laminate them one on the other. FIG. 27B shows an electrode substrate comprising a metallic foil 233 having holes formed thereon is overlaid on the porous metallic sheet 220. FIG. 27C shows an electrode substrate comprising the porous metallic sheet 220 and a porous metallic sheet 234, overlaid on the porous metallic sheet 220, formed by electrically plating a conductive foamed sheet, a mesh sheet or a nonwoven sheet and by performing resin binder-removing and sintering operations. If it is necessary to form throughholes in the laminated sheets, circular or rhombic holes are formed by press with the sheets laminated one on the other to form a porous metallic sheet having circular holes or lath-shaped holes.

In the fifth through seventh embodiments, short metallic fibers are intertwined with each other three-dimensionally. In the eight embodiment, using long or continuous metallic fibers intertwined with each other three-dimensionally to form a sheet, and the sheet is heated under pressure similarly to the fifth embodiment so as to fuse the surfaces of the fibers with each other at the point of the intersection.

For example, the coiled continuous metallic fibers (F) manufactured as shown in FIG. 4 by using the manufacturing apparatus shown in FIG. 2 is supplied to a removal and sintering oven, and then, supplied to a supporter. Then, columnar water current is injected at a high speed to the coiled continuous metallic fibers under a high pressure similarly to the fifth embodiment so as to intertwine them with each other. Thereafter, they are heated under pressure similarly to the fifth embodiment so as to fuse the surfaces of the fibers with each other at the point of the intersection.

When the porous metallic sheet is composed of the continuous metallic fibers, the ends of the metallic fibers hardly project from the surface of the porous metallic sheet. Thus, when the porous metallic sheet is used as an electrode plate, leak never occurs in the edge thereof.

Fourth through 11th experiments of the second invention are described below. In these experiments, columnar water current was injected at a high speed to the metallic fibers under a high pressure to intertwine them with each other three-dimensionally.

Porous metallic sheets described in the fourth through seventh experiments are preferably used as an electrode substrate of a lithium secondary battery.

In the fourth experiment, a web was formed from short fibers of copper, having 15 $\mu$m in diameter and 1.5 mm in length, manufactured by chattering-vibration cutting method by using 72.4 g of copper per centiare. The web was provided to a flat supporter and then, columnar water current was injected to the web at a high pressure in a direction perpendicular thereto so as to intertwine the metallic fibers with each other to form a sheet. Then, the sheet was dehydrated and dried. Thereafter, the surfaces of the metallic fibers were connected to each other by fusing them in nonoxidizing atmosphere, at 700° C., at a pressure of 3 kgf/mm. Then, reduction was performed in an atmosphere of $H_2$ at 700° C. Then, the thickness of the sheet was adjusted to a required one with a calendar roll to obtain a porous metallic sheet having 20 $\mu$m in thickness and 60% in percentage of pores. The tensile force of the porous metallic sheet was 11.5 kgf/20 mm.

In the fifth experiment, a web was formed from short fibers of stainless steel, having 10 $\mu$m in diameter and 9 mm in length, manufactured by convergent drawing method by using 52.4 g of stainless steel per centiare. The web was delivered to the flat supporter and then, columnar water current was injected to the web at a high pressure in a direction perpendicular thereto so as to intertwine the metallic fibers with each other to form a sheet. Then, the sheet was dehydrated and dried. Thereafter, the surfaces of the metallic fibers were connected to each other by fusing them in nonoxidizing atmosphere, at 1000° C., at a pressure of 6 kgf/mm. Then, reduction was performed in an atmosphere of $H_2$ at 1000° C. Then, the thickness of the sheet was adjusted to a required one with a calendar roll to obtain a porous metallic sheet having 15 $\mu$m in thickness and 39% in percentage of pores. The tensile force of the porous metallic sheet was 10.5 kgf/20 mm.

In the sixth experiment, a web was formed from short fibers of only copper powder. Each fiber of the web has 20 $\mu$m in diameter and 4 mm in length, manufactured by metallic fibers-spinning method by using 80.5 g of copper per centiare without mixing resin binder with the copper powder. The web was delivered to a flat supporter and then, columnar water current was injected to the web at a high pressure in a direction perpendicular thereto so as to intertwine the metallic fibers with each other to form a sheet. Then, the sheet was dehydrated and dried. Thereafter, the surfaces of the metallic fibers were connected to each other by fusing them in nonoxidizing atmosphere, at 700° C., at a pressure of 3 kgf/mm. Then, reduction was performed in an atmosphere of $H_2$ at 700° C. Then, the thickness of the sheet was adjusted to a required one with a calendar roll to obtain a porous metallic sheet having 18 $\mu$m in thickness and 50% in percentage of pores. The tensile force of the porous metallic sheet was 12.1 kgf/20 mm.

In the seventh experiment, a web was formed from short fibers of aluminum, having 15 $\mu$m in diameter and 4 mm in length, manufactured by metallic fibers-spinning method by using 38.0 g of aluminum per centiare. The web was delivered to a flat supporter and then, columnar water current was injected to the web at a high pressure in a direction perpendicular thereto so as to intertwine the metallic fibers with each other to form a sheet. Then, the sheet was dehydrated and dried. Thereafter, the surfaces of the metallic fibers were connected to each other by fusing them in nonoxidizing atmosphere, at 400° C., at a pressure of 3 kgf/mm. Then, reduction was performed in an atmosphere of $H_2$ at 400° C. Then, the thickness of the sheet was adjusted to a required one with a calendar roll to obtain a porous metallic sheet having 20 $\mu$m in thickness and 30% in percentage of pores. The tensile force of the porous metallic sheet was 5.2 kgf/20 mm.

Porous metallic sheets described in the eighth and ninth experiments are preferably as an electrode substrate of a primary lithium battery.

In the eighth experiment, a web was formed from short fibers of stainless steel (SUS444) having 15 $\mu$m in diameter and 3 mm in length, manufactured by chattering vibration method by using 38.0 g of stainless steel per centiare. The web was delivered to a supporter on which pyramidal convexes were formed widthwise at regular intervals. Flat portions having a width of 7 mm were also formed widthwise on the supporter at intervals of 20 mm. Each bottom of the convex was rhombic. The longer diagonal line of the rhombic bottom of each convex was 2.5 mm and the shorter diagonal line thereof was 0.8 mm. Columnar water current was injected to the web at a high pressure in a direction perpendicular thereto so as to intertwine the metallic fibers with each other to form a sheet. Then, the sheet was dehydrated and dried. Thereafter, the surfaces of the metallic fibers were connected to each other by fusing them in nonoxidizing atmosphere, at 1000° C., at a pressure of 6 kgf/mm. Then, reduction was performed in an atmosphere of $H_2$ at 1000° C. Then, the thickness of the sheet was adjusted to a required one with a calendar roll to obtain a lath-shaped porous metallic sheet having 200 μm in thickness, 76% in percentage of pores, and having a portion, serving as a lead, having a width of 7 mm and located widthwise at intervals of 20 mm. The tensile force of the porous metallic sheet was 15 kgf/20 mm.

In the ninth experiment, a web was formed from short fibers of stainless steel (SUS444) having 8 μm in diameter and 5 mm in length, manufactured by convergent drawing method by using 254.1 g of stainless steel per centiare. The web was delivered to a flat supporter on which quadrangular pyramidal convexes each having a square (2 mm×2 mm) on its bottom. Then, columnar water current was injected to the web at a high pressure in a direction perpendicular thereto so as to intertwine the metallic fibers with each other to form a sheet. Then, the sheet was dehydrated and dried. Thereafter, the surfaces of the metallic fibers were connected to each other by fusing them in nonoxidizing atmosphere, at 1000° C., at a pressure of 5.8 kgf/mm. Then, reduction was performed in an atmosphere of $H_2$ at 1000° C. Then, the thickness of the sheet was adjusted to a required one with a calendar roll to obtain a porous metallic sheet having 160 μm in thickness and 80% in percentage of pores. The tensile force of the porous metallic sheet was 15.6 kgf/20 mm.

Porous metallic sheets described in the 10th and 11th experiments are preferably used as used an electrode substrate of a nickel cadmium battery or that of a nickel hydrogen battery.

In the 10th experiment, a web was formed from short fibers of iron, having 8 μm in diameter and 10 mm in length, manufactured by chattering-vibration cutting method by using 132 g of iron per centiare. The web was delivered to the flat supporter and then, columnar water current was injected to the web at a high pressure in a direction perpendicular thereto so as to intertwine the metallic fibers with each other to form a sheet. Then, the sheet was dehydrated and dried. Thereafter, the sheet was nickel-plated. Then, the surfaces of the metallic fibers were connected to each other by fusing them in nonoxidizing atmosphere, at 1000° C., at a pressure of 6 kgf/mm. Then, reduction was performed in an atmosphere of $H_2$ at 1000° C. Then, the thickness of the sheet was adjusted to a required one with a calendar roll to obtain a porous metallic sheet having 50 μm in thickness and 66.4% in percentage of pores. The tensile force of the porous metallic sheet was 7.2 kgf/20 mm.

In the 11th experiment, a nickel-contained compound fiber, having 15 μm in diameter and 20 mm in length, manufactured from a mixture of nickel powder and resin binder by metallic fibers-spinning method. The resin binder was burnt out in atmospheric atmosphere at 850° C., and nickel powder was sintered in atmosphere of $H_2$ at 1000° C. to form a web of nickel fibers having 13 μm in diameter and 13 mm in length by using 150 g of nickel per centiare. The metallic fibers were intertwined with each other to form a sheet. Then, the sheet was dehydrated and dried. Then, the surfaces of the metallic fibers were connected to each other by fusing them in nonoxidizing atmosphere, at 1000° C., at a pressure of 6 kgf/mm. Then, reduction was performed in an atmosphere of $H_2$ at 1000° C. Then, the thickness of the sheet was adjusted to a required one with a calendar roll to obtain a porous metallic sheet having 50 μm in thickness and 65% in percentage of pores. The tensile force of the porous metallic sheet was 11.8 kgf/20 mm.

Similarly to the first through third experiments, an active substance was applied to the porous metallic sheet obtained in the fifth through 11th experiments. In each of the porous metallic sheets, the contact area between the active substance and the metallic fibers was large and the tensile force of each porous metallic sheet was so high that each porous metallic sheet was resistant to a drawing force applied thereto in applying the active substance thereto and coiling it via a separator.

In the 12th experiment, paste of a mixture was applied to 100 wt % of alloy powder containing $LmNi_{4.2}Co_2Mn_{0.8}Al_{0.3}$, 0.5 wt % of sodium polyacrylate, 0.13 wt % of carboxymethyl cellulose, 1.45 wt % of polytetrafluoroethylene of dispersion type, 1.5 wt % of carbon black serving as a conduction material, and water. After the paste was dried, a sheet was molded under pressure to form an electrode plate of a nickel hydrogen battery.

As apparent from the foregoing description, the porous metallic sheet to be used as the electrode substrate of a battery in accordance with the present invention has the following effects.

(1) The thickness of the porous metallic sheet and the percentage of pores thereof can be controlled easily. That is, in making the thickness of the conventional punched metal small, for example as small as less than 60 μm, the material cost such as an iron plate becomes high and workability becomes inferior. On the other hand, the porous metallic sheet in accordance with the present invention is formed of fine metallic fibers, having 1–100 μmφ in diameter, laminated one on the other. Thus, the thickness of the porous metallic sheet and the percentage of pores can be adjusted to 10 μm–500 μm and 20–90%, respectively by changing the amount of metallic fibers and the diameters thereof. In particular, the thickness of the porous metallic sheet can be reduced to less than 60 μm although it is difficult for the conventional method to do so. As such, the weight of metal per area can be reduced because a thin porous metallic sheet can be formed and the porous metallic sheet can be allowed to have a high percentage of pores. Thus, according to the present invention, the thinner the porous metallic sheet is, the less expensive the material cost becomes.

(2) In applying an active substance to through-holes of the conventional punched metal and coating the surface thereof with the active substance, the degree of adherence of the active substance to the surface thereof is not high because portions other are flat and smooth. Thus, in subsequent processes, there is a possibility that the active substance is removed from the surface of the punched metal sheet. On the other hand, because the metallic fibers of the porous metallic sheet in accordance with the present invention are three-dimensionally intertwined with each other, the region other than through-holes are three-dimensional, which allows the active substance to be applied to pores located in the interior of the porous metallic sheet. Therefore, the active substance becomes in close contact with the metallic fibers and hence, is not removed therefrom in subsequent processes.

(3) Because the porous metallic sheet according to the present invention is made of metallic fibers three-dimensionally intertwined with each other by using water current having a high speed and a high pressure or a needle punch. Therefore, the metallic fibers intersect with each other at many points. The intersections of the intertwined metallic fibers are pressurized in nonoxidizing atmosphere at a high temperature not exceeding the melting point of metal to fuse the surfaces of the metallic fibers with each other. At this time, because the surfaces of the metallic fibers are connected directly with each other under pressure by fusing, they intersect with each other at many points and points of intersections are fused together. Thus, the porous metallic sheet having a high tensile force can be obtained. In addition, ends of the surfaces of the metallic fibers are connected with each other by fusion and hence do not project from the surface of the porous metallic sheet. Accordingly, when the porous metallic sheet is coiled via a separator after applying an active substance thereto, the generation of leak can be prevented. Further, because the active substance and the metallic fibers are in contact at many points, the porous metallic sheet allows electric current to flow reliably, thus serving as a highly conductive substrate. The resistance of a conventional punched metal (iron+plated nickel) is 10 mΩ/50 mm, while that of the porous sheet made of nickel according to the present invention is 8 mΩ/50 mm which is lower than 10 mΩ/50 mm.

(4) The convexes formed on the supporter on which the web is placed causes metallic fibers to make through-holes with accumulating the web on flat portions of the supporter. When columnar water current is injected to the web in a direction perpendicular to the web in order to intertwine the metallic fibers with each other, the through-holes are formed at the same time. As a result, punched-shaped, lath-shaped or net-shaped patterns are formed on a resulting porous metallic sheet depending on the configuration of the convexes. In this manner, required through-holes can be easily formed, and it is not necessary to form the through-holes in a subsequent process. Thus, the porous metallic sheet can be manufactured at a low cost. Furthermore, belt-shaped flat portions are formed lengthwise in a region in which the through-holes are not formed, so as to form the belt-shaped flat portions for utilizing as leads of an electrode plate on the metallic fibers-intertwined sheet, simultaneously with the formation of the through-holes.

(5) Further, because the diameters of the metallic fibers composing the porous metallic sheet can be allowed to be small, a thin porous metallic sheet can be produced. Moreover, because the porous metallic sheet is allowed to have a high percentage of pores, a large amount of active substance can be applied thereto. That is, the porous metallic sheet has a high conductivity and increases the capacity of a battery, because a large amount of active substance can be applied thereto. In addition, as an electrode substrate is thin and, it is flexible, the substrate disperses an external force applied thereto when the porous metallic sheet is cut to a plurality of pieces having a predetermined size after the active substance is applied thereto. Thus deformation or burr hardly occurs in the substrate. When the substrate is coiled to be accommodated in a spiral type battery, it can be coiled without generating leak or crack.

(6) Because a sheet having a porous structure is made of solid metallic fibers, metal surrounding pores is uniformly distributed on the surface thereof and in the interior thereof. According to the conventional method, the surface of organic fibers is plated and then burnt out. Therefore, cavities to which the active substance cannot be applied are present in the metallic fibers. On the other hand, because cavities are not present in the metallic fibers of the present invention, on the porous metallic sheet, there is no portion to which the active substance cannot be applied. Further, because the diameter of the metallic fiber of the present invention is smaller than that of the conventional metallic fiber having a cavity therein, the percentage of pores can be increased and thus the application amount of the active substance can be increased. In addition, supposing that the same amount of metal is used per ($m^2$) both in the porous metallic sheet of the present invention and that the conventional one and the percentage of pores of the former is equal to that of the latter, the number of the metallic fibers to be used in the former is greater than that of the metallic fibers of the latter, while the area of one pore of the porous metallic sheet of the former is smaller than that of one pore of the porous metallic sheet of the latter. Thus, the porous metallic sheet of the present invention increases the conductivity of the substrate, thus improving the performance of the battery.

(7) The method of manufacturing the porous metallic sheet to be used as the electrode substrate of the battery according to the present invention eliminates conductivity imparting process and plating process which are required conventionally. Thus the method eliminates the problem of a waste solution which is generated when plating used to manufacture the porous metallic sheet. That is, the manufacturing method is pollution-preventive. In addition, the manufacturing method saves electric power, thus reducing manufacturing cost greatly.

(8) Even though electrical plating is used to increase the strength of the porous metallic sheet, the amount of metal to be applied to the porous metallic sheet of the present invention is smaller than that to be applied to the conventional porous metallic sheet. Hence, the method of the present invention reduces the rate of electric power consumption.

What is claimed is:

1. A method of manufacturing a porous metallic sheet to be used as an electrode substrate of a battery, comprising the steps of:

placing a web comprising metallic fibers on a supporter;

injecting fluid having a high pressure and a high speed to the web to intertwine the metallic fibers with each other to form the metallic fibers into a three-dimensional sheet; and heating the three-dimensional sheet comprising intertwined metallic fibers at a pressure and at a temperature lower than the melting point of the metallic fibers so as to fuse surface of the metallic fibers at points of intersection.

2. The method of manufacturing the porous metallic sheet according to claim 1, wherein the three-dimensional sheet comprising the intertwined metallic fibers is heated under pressure in a nonoxidizing atmosphere; and consecutively reduction is performed in an atmosphere in which $H_2$ is present.

3. The method of manufacturing the porous metallic sheet according to claim 1, wherein high pressure-columnar water current used as the fluid having the high pressure and the high speed is injected to the web, in a direction perpendicular thereto, placed on the supporter so as to form a metallic fibers-intertwined sheet; the sheet is dehydrated and dried; and the sheet is heated at the pressure.

4. The method of manufacturing the porous metallic sheet according to claim 1, wherein convexes are formed on an upper surface of the supporter so as to form through-holes on the metallic fibers-intertwined sheet in correspondence to the locations of the convexes.

5. The method of manufacturing the porous metallic sheet according to claim 4, wherein belt-shaped portions are formed at predetermined intervals on the supporter in which the convexes are not formed, so as to form portions, which are used as leads of the electrode of the battery on the metallic fibers-intertwined sheet, in correspondence to the belt-shaped portions.

6. The method of manufacturing the porous metallic sheet according to claim 1, wherein the web comprises fine continuous metallic fibers formed by convergent-drawing method, metallic fiber-spinning method or metallic foil-cutting method; short metallic fibers formed by cutting the fine continuous metallic fibers; or short fibers formed by chattering-vibration method for cutting a metallic bar or a coiled metallic foil.

7. The method of manufacturing the porous metallic sheet according to claim 6, wherein the metallic fiber-spinning method forms metallic powders into the metallic fibers.

8. The method of manufacturing the porous metallic sheet according to claim 1, wherein a porous fibrous structure comprising the metallic fibers or a three-dimensional net-shaped structure comprising the metallic fibers is electrically plated.

* * * * *

UNITED STATES PATENT AND TRADEMARK OFFICE
CERTIFICATE OF CORRECTION

PATENT NO.: 6,110,417
DATED: August 29, 2000
INVENTOR: SUGIKAWA, HIROFUMI

It is certified that error appears in the above-identified patent and that said Letters Patent is hereby corrected as shown below:

The title of the invention should read:

POROUS METALLIC SHEET USED AS AN ELECTRODE SUBSTRATE OF A BATTERY AND METHOD OF MANUFACTURING THE POROUS METALLIC SHEET

Signed and Sealed this

First Day of May, 2001

*Attest:*

NICHOLAS P. GODICI

*Attesting Officer*     *Acting Director of the United States Patent and Trademark Office*